Oct. 15, 1940.  F. M. ZENNER  2,217,782
AUTOMATIC PRESSING MACHINE FOR KEY CARDS AND LIKE ARTICLES
Filed Aug. 10, 1937  14 Sheets-Sheet 1
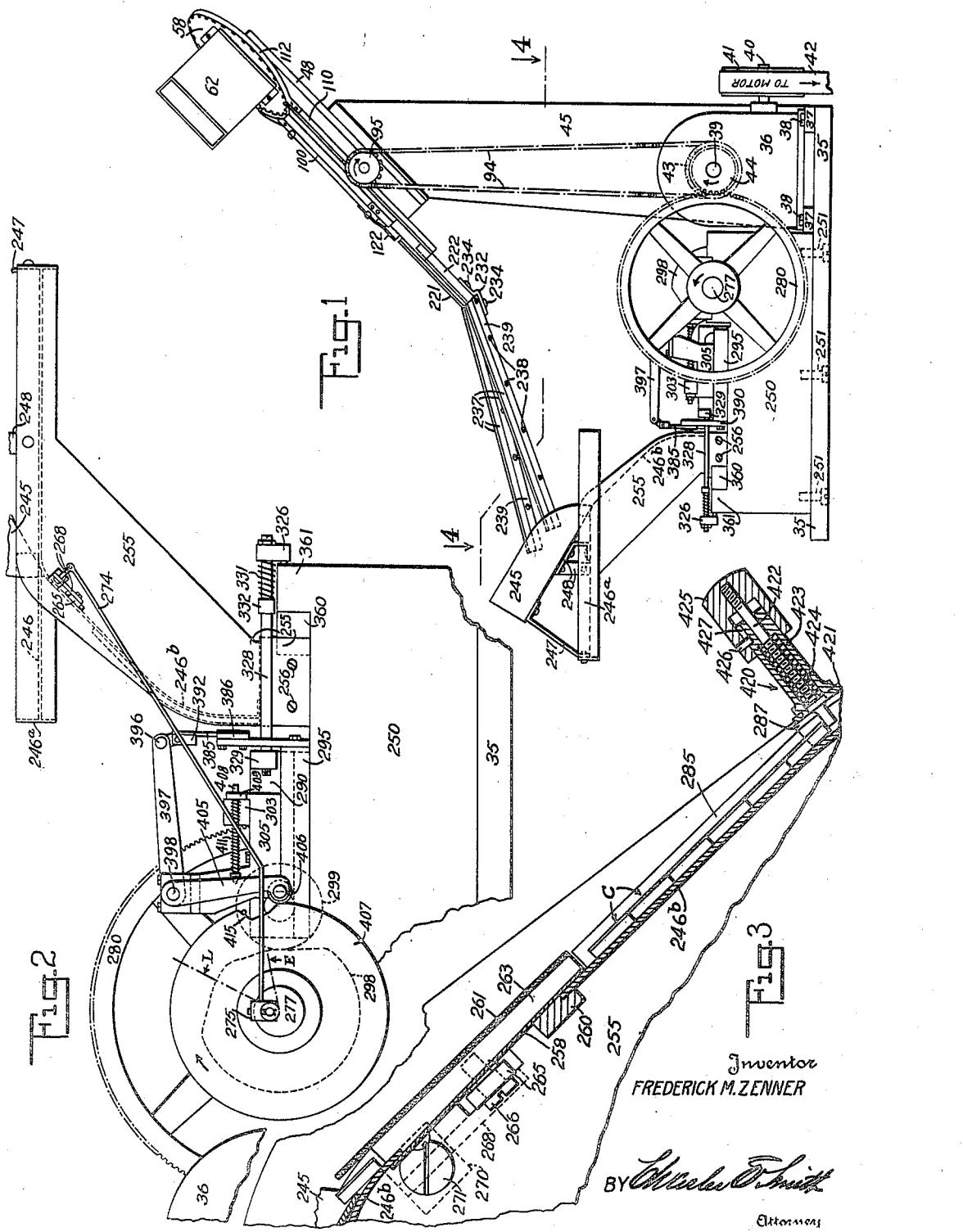
Inventor
FREDERICK M. ZENNER

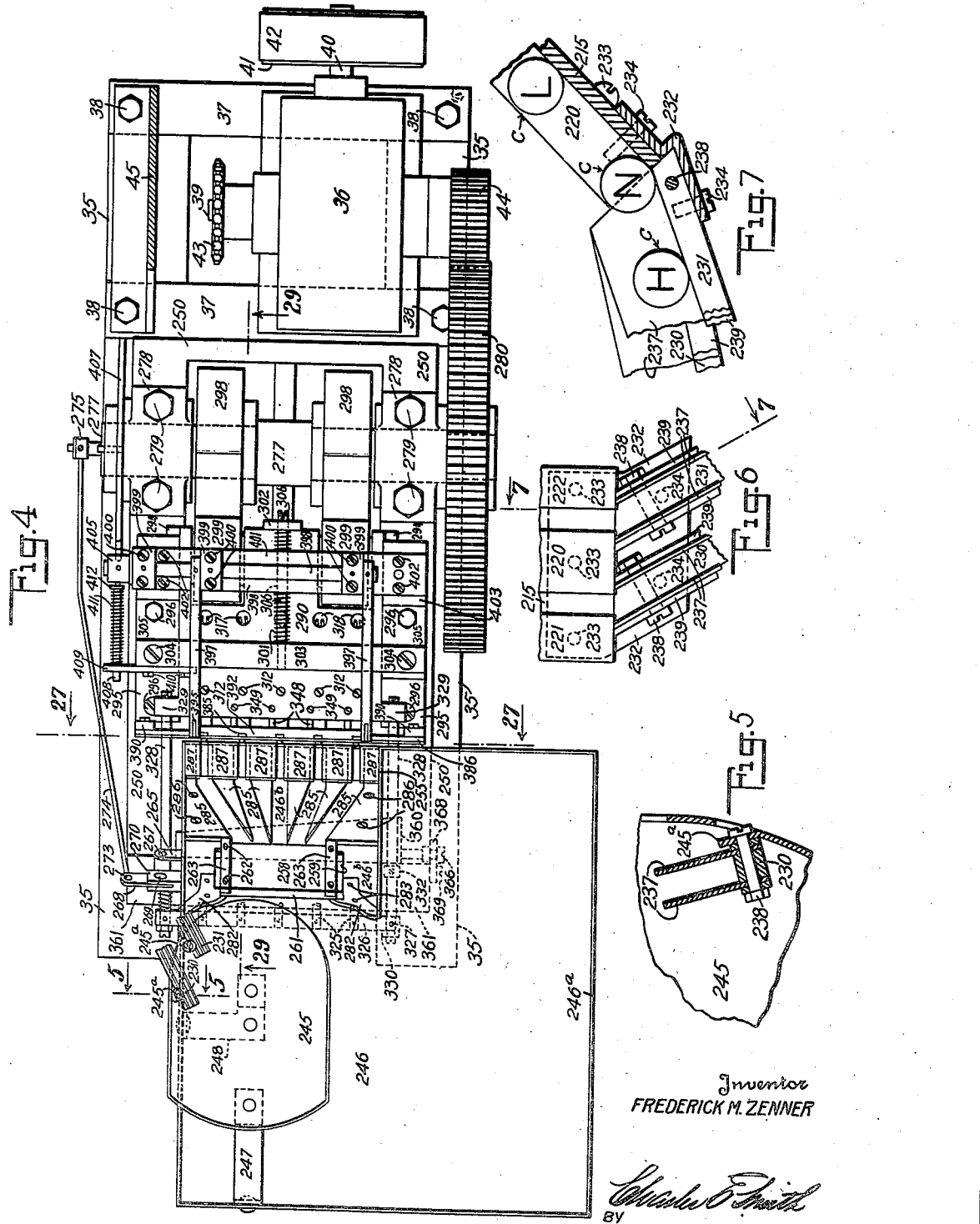

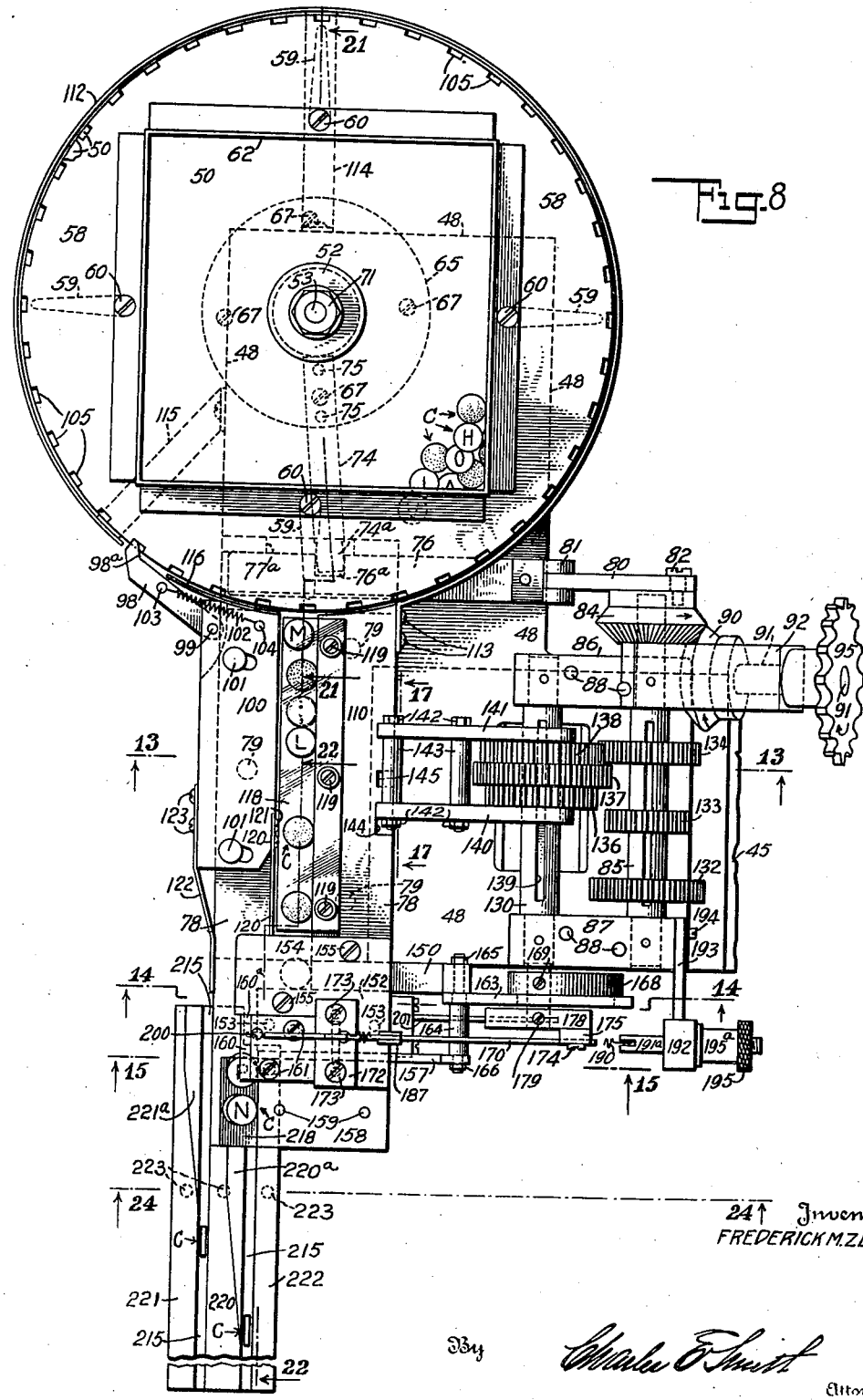

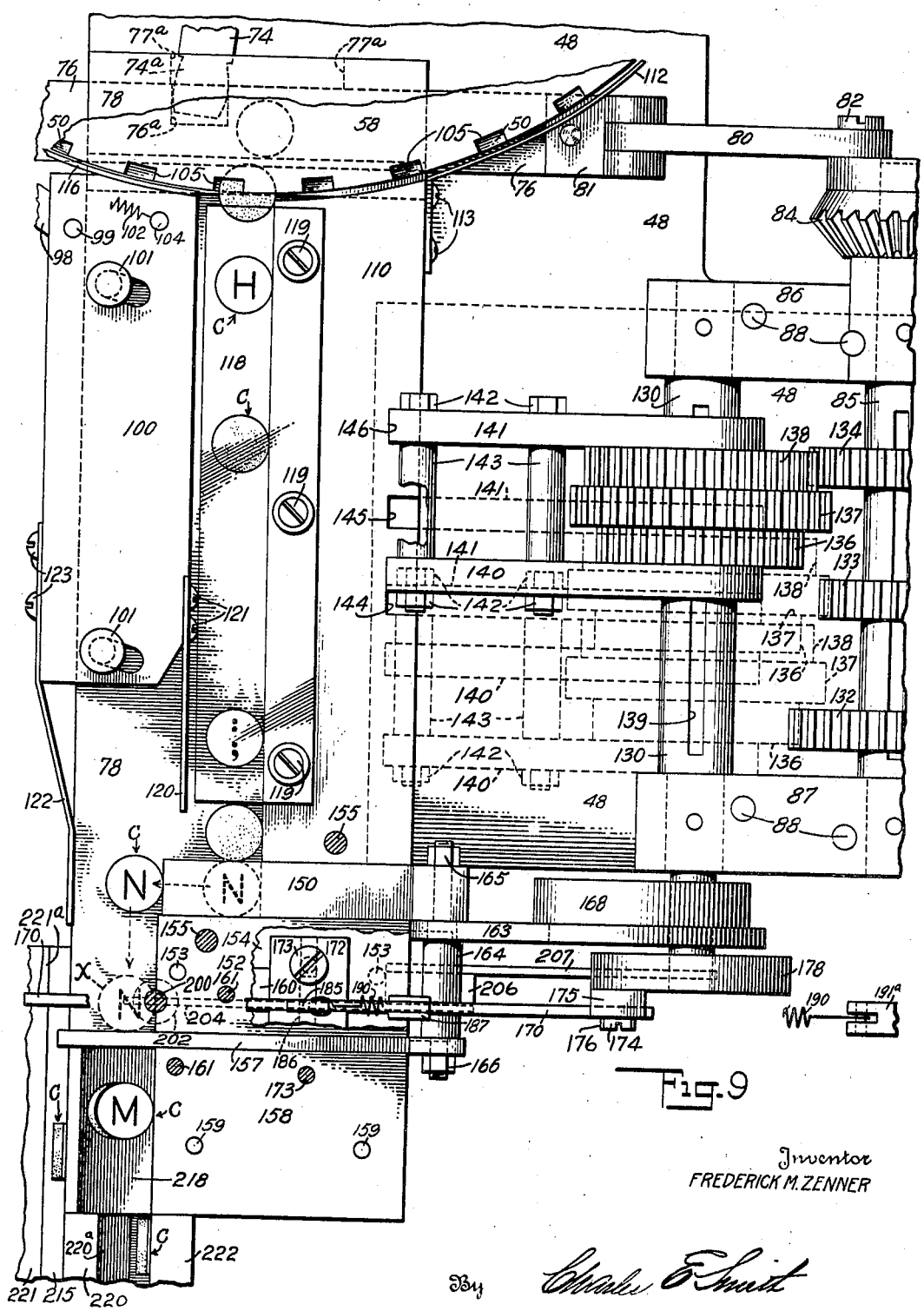

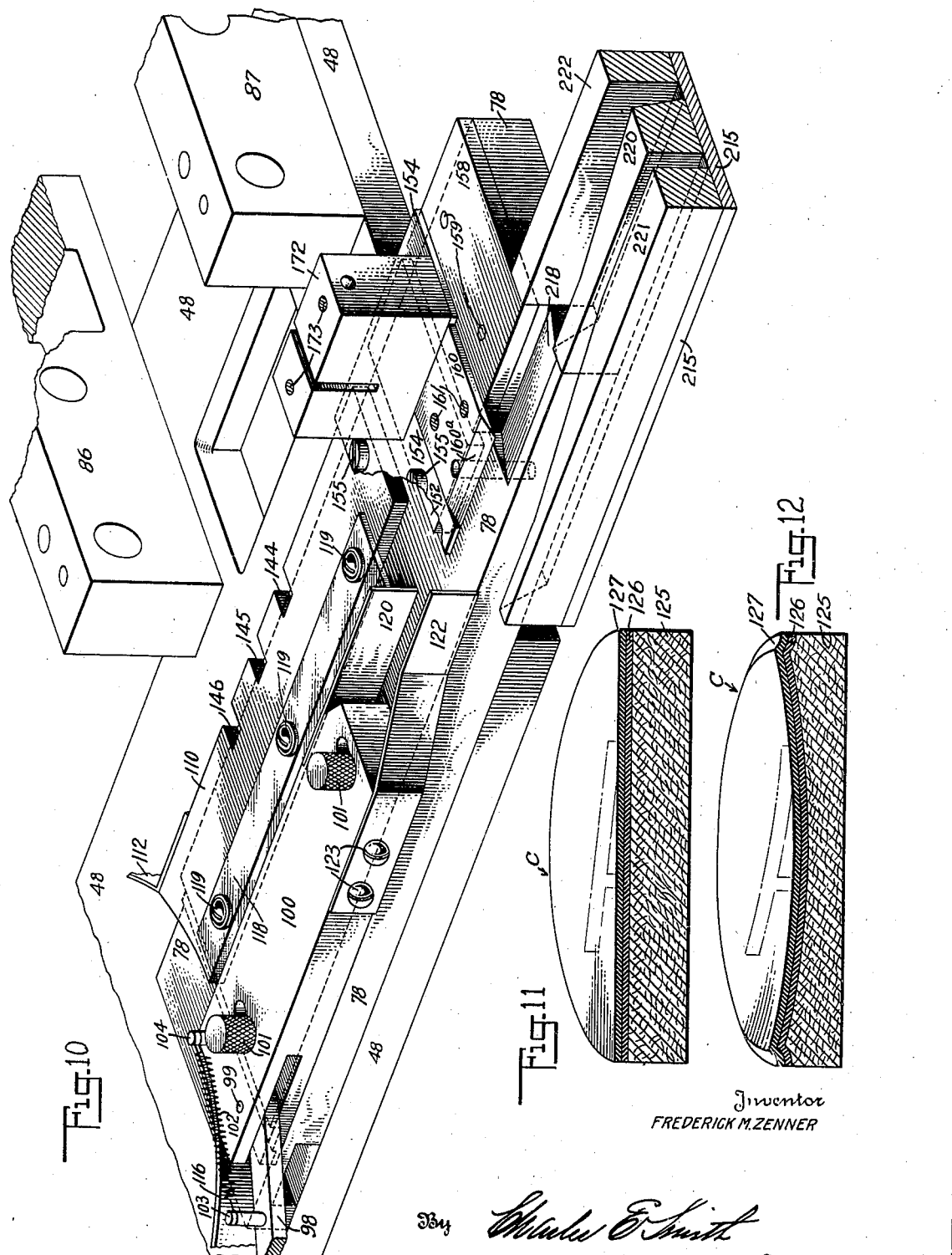

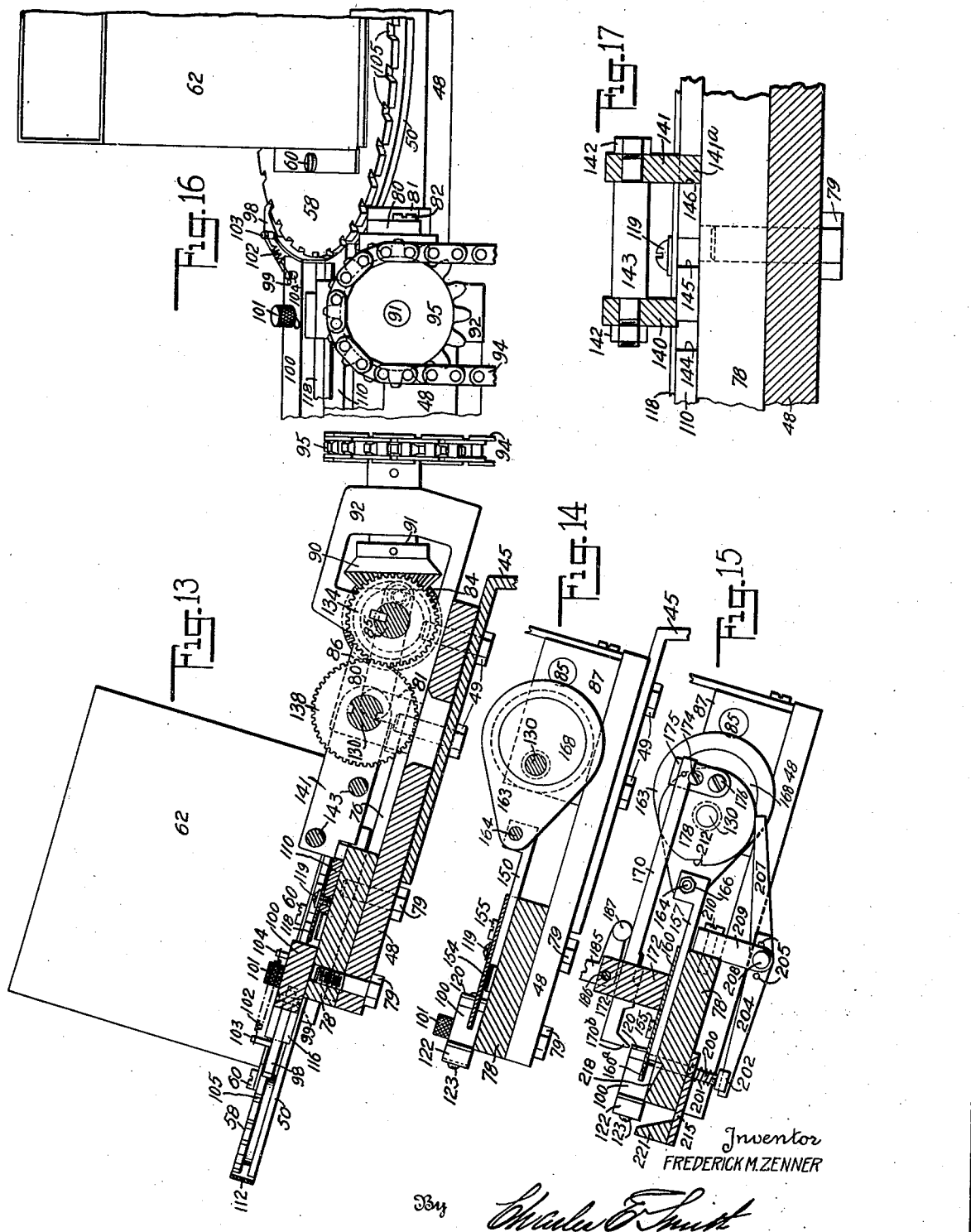

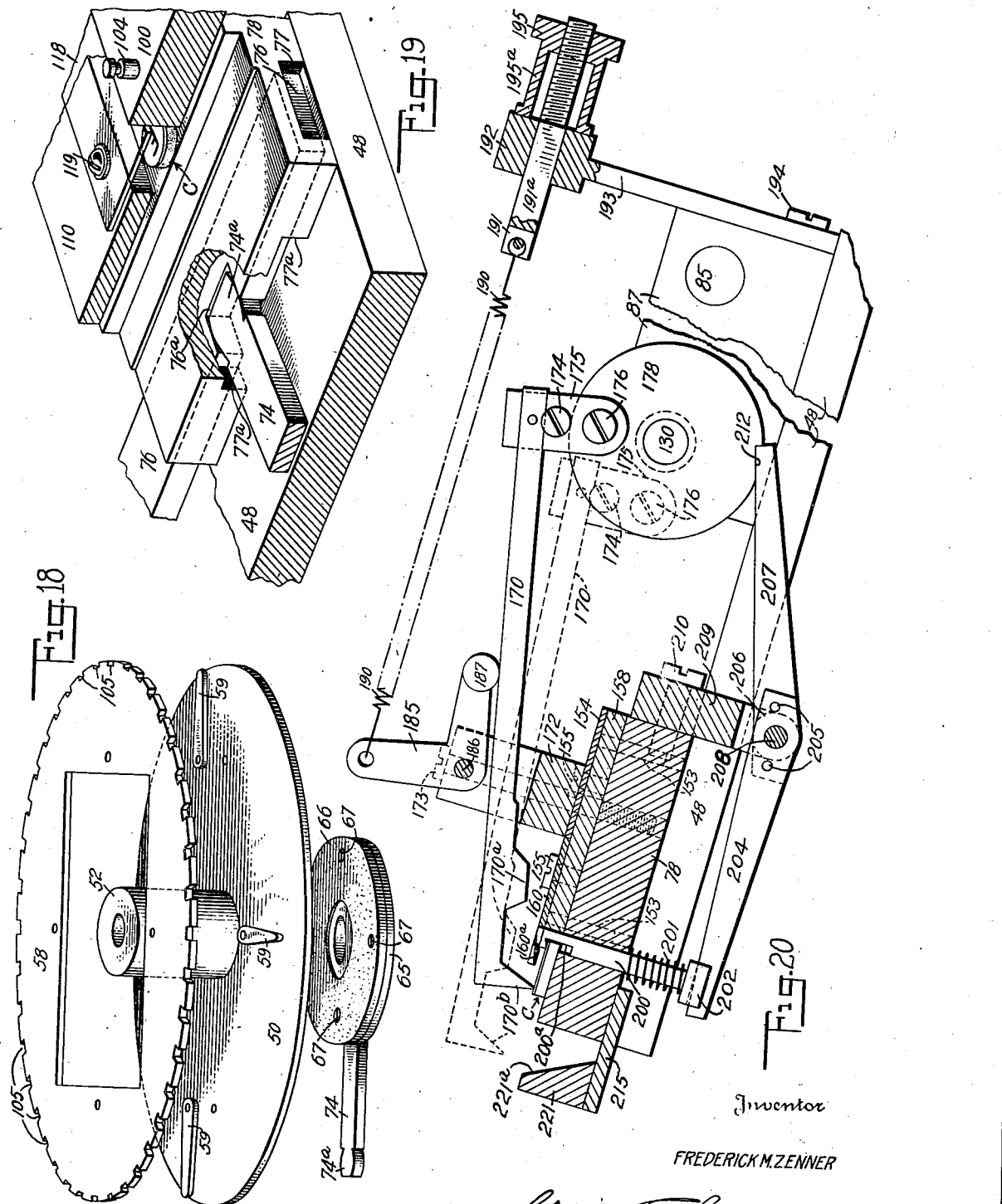

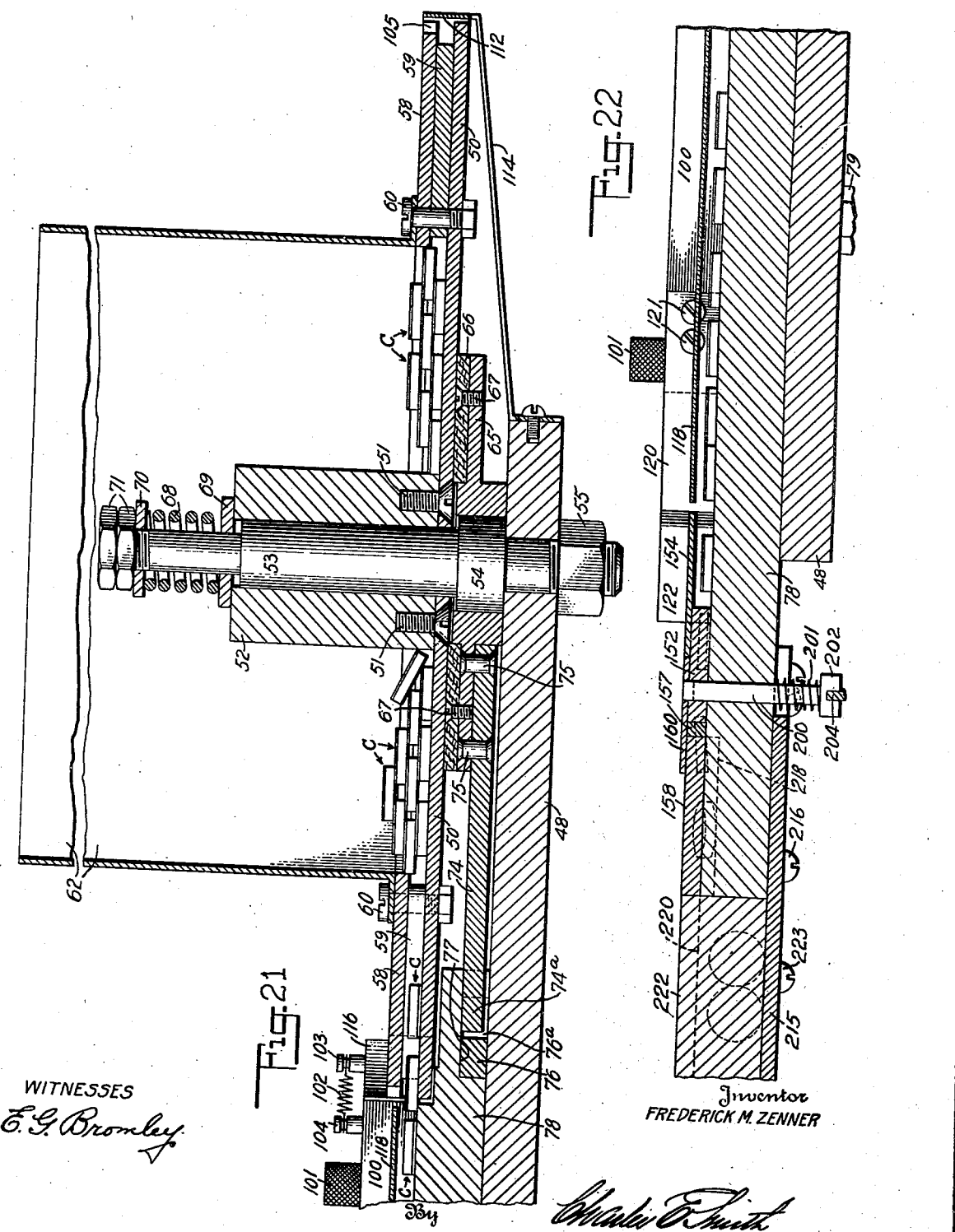

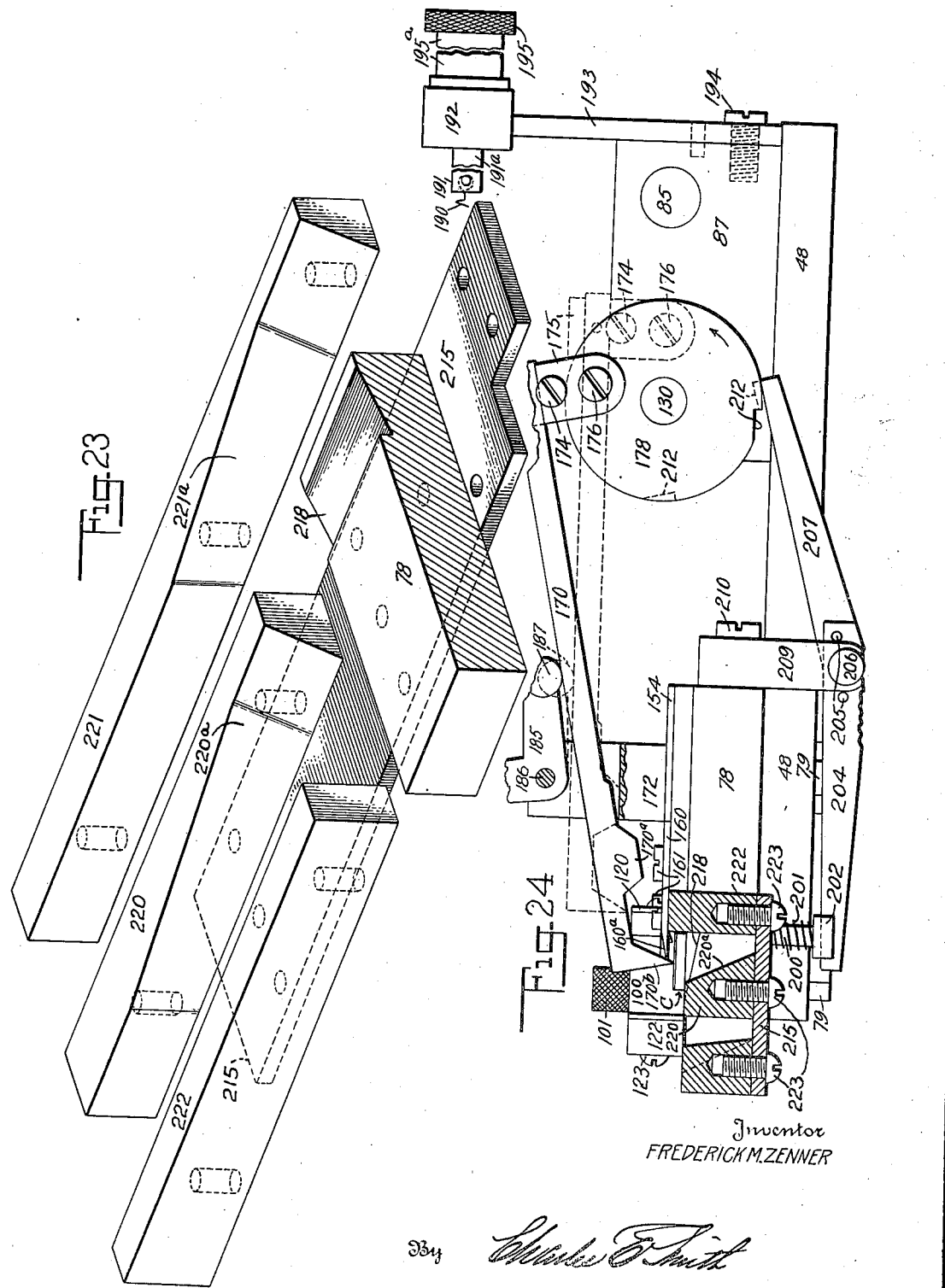

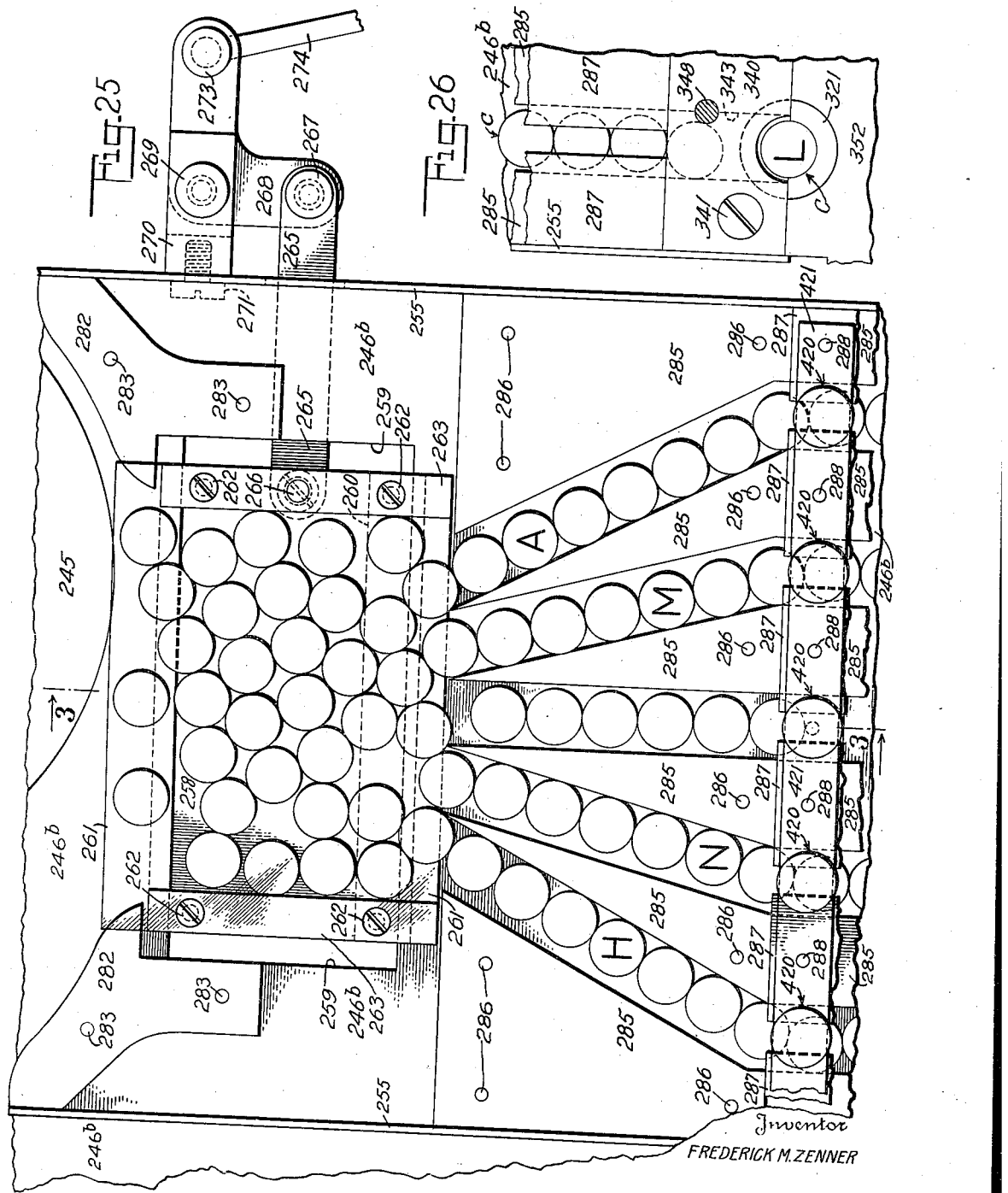

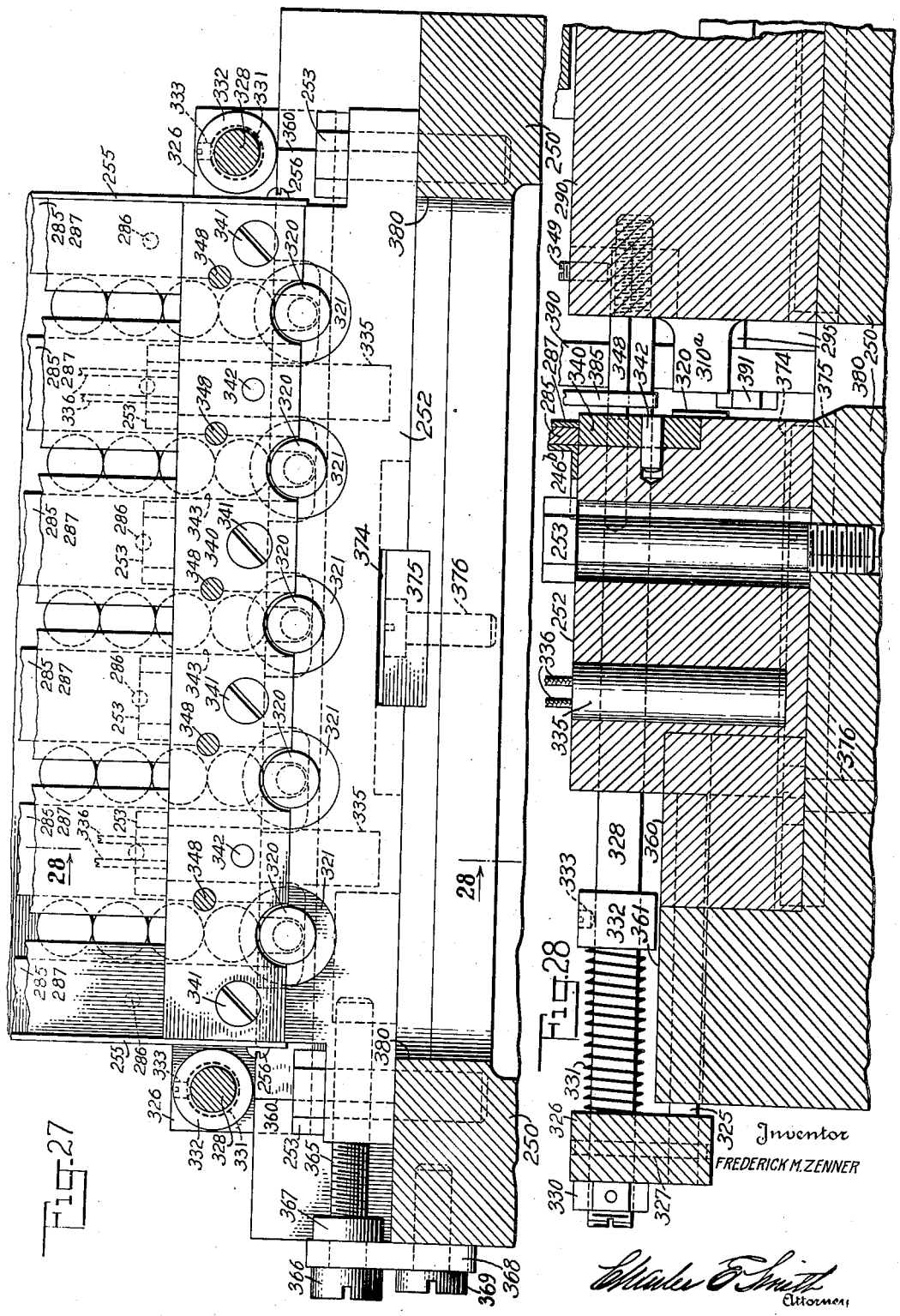

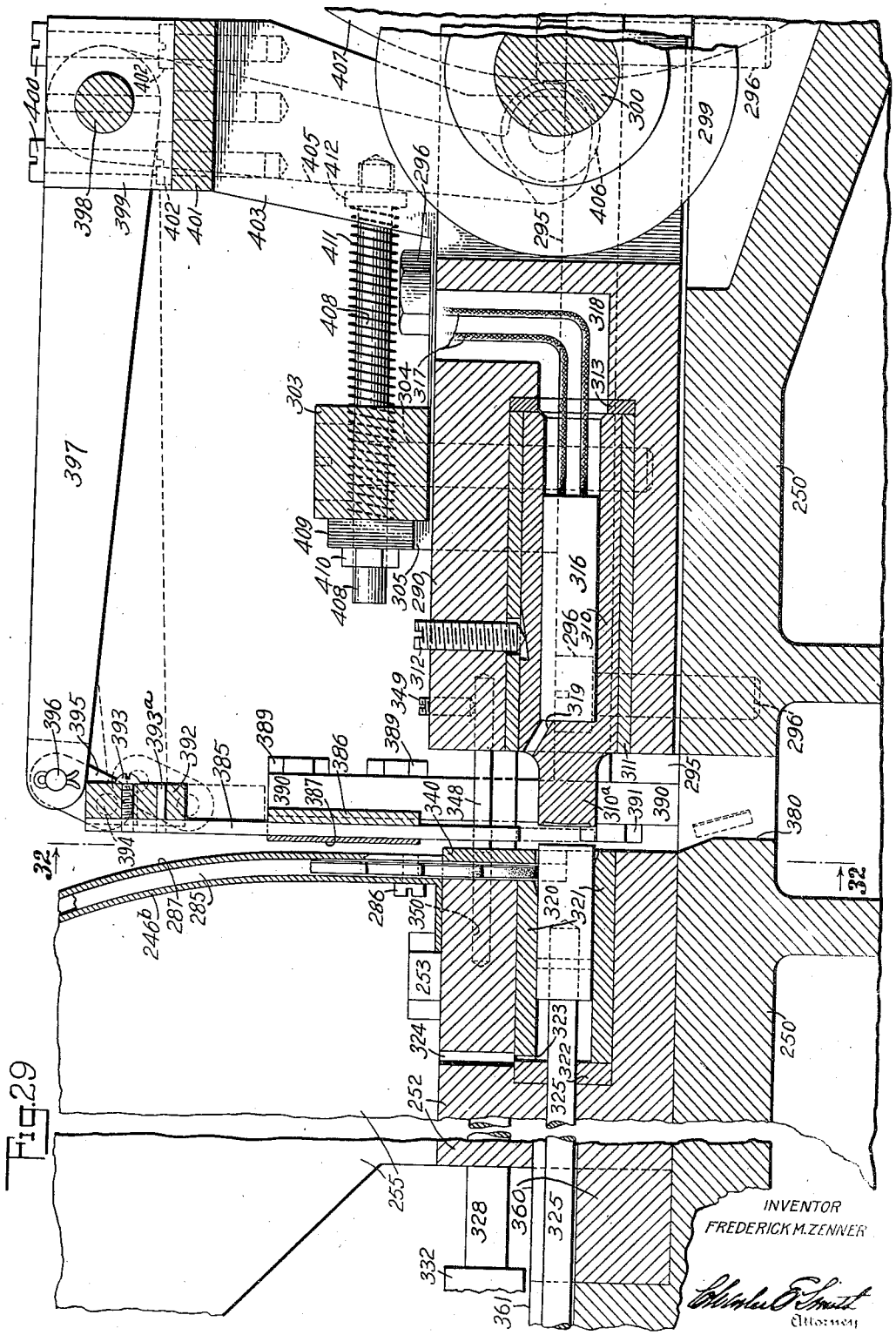

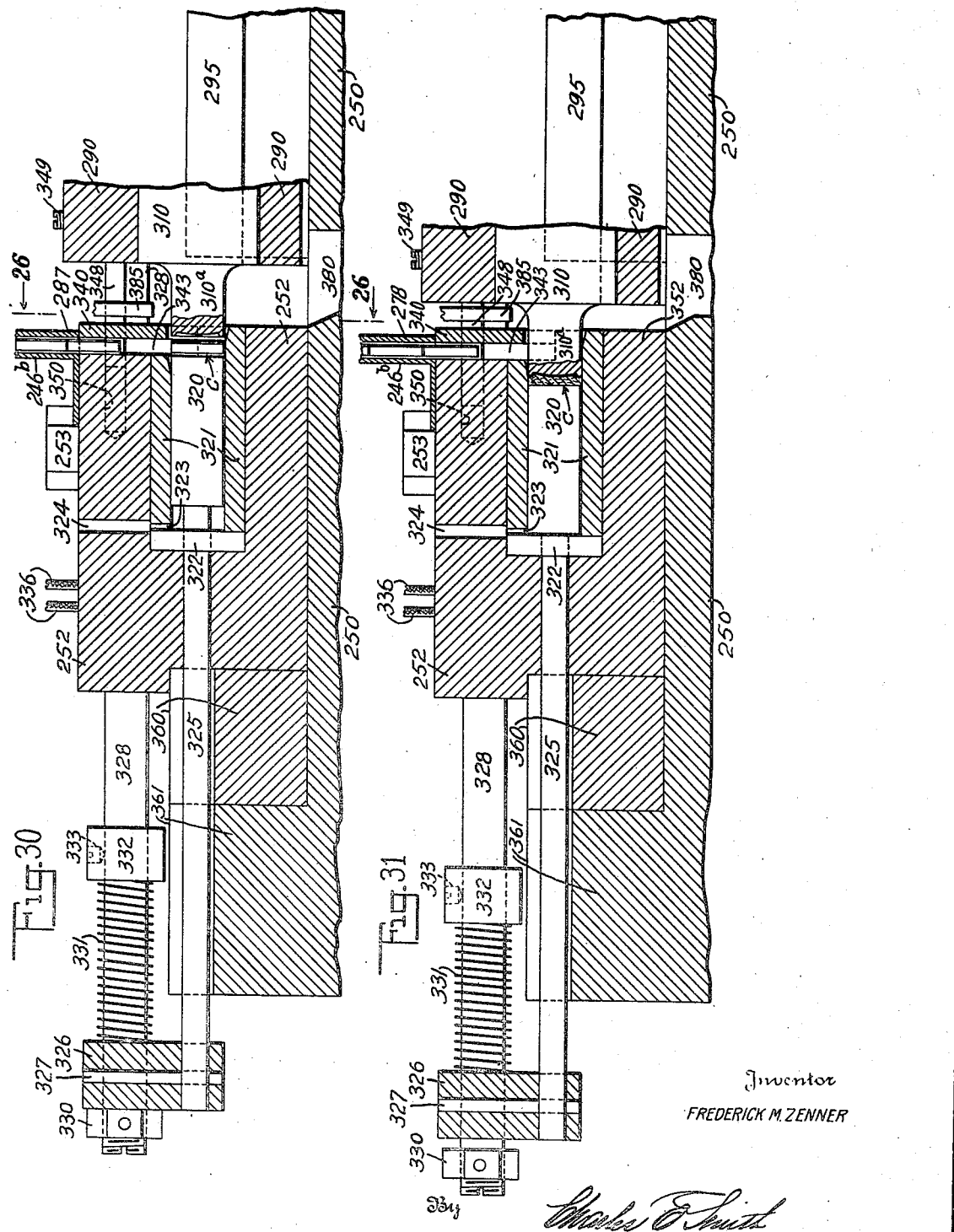

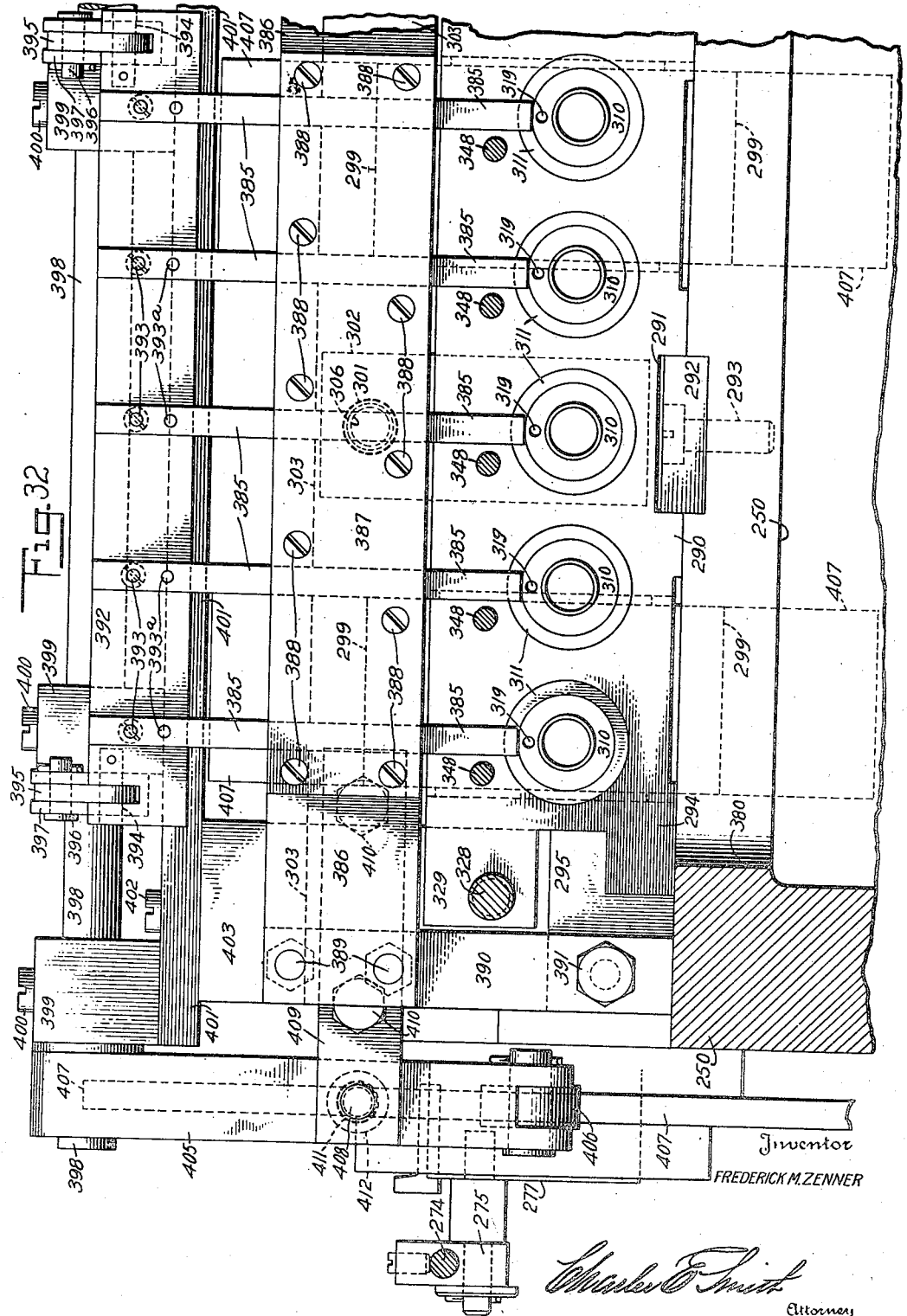

Patented Oct. 15, 1940

2,217,782

UNITED STATES PATENT OFFICE 2,217,782

AUTOMATIC PRESSING MACHINE FOR KEY CARDS AND LIKE ARTICLES

Frederick M. Zenner, Southington, Conn., assignor to Remington Rand Inc., Buffalo, N. Y., a corporation of Delaware Application August 10, 1937, Serial No. 158,405

28 Claims. (Cl. 18—5)

My invention relates to a machine for acting on key cards for typewriting and like machines and more particularly to improved means for automatically pressing such key cards or like articles.

One of the main objects of my invention, generally stated, is to provide improved, highly efficient and reliable means for automatically pressing key cards.

Another object of my invention is to provide automatically operating means for delivering key cards or like articles from an unrelated relation in a hopper to the pressing means in such a manner that each card bears the same relation to the pressing means and the same face of each card has a concavity or other configuration formed therein by the pressing means.

Still another object of my invention is to provide a pressing means and a delivering means therefor which have a timed relation to each other and wherein the speed of operation of the delivering means may be readily adjusted to accord with the number of key cards being simultaneously acted on by the pressing means.

To the above and other ends which will hereinafter appear, my invention consists in the features of construction, arrangements of parts and combinations of devices to be hereinafter described and particularly pointed out in the appended claims.

In the accompanying drawings, wherein like reference characters indicate corresponding parts in the various views:

Fig. 1 is a side elevational view of a machine embodying my invention.

Fig. 2 is a fragmentary side elevational view of the pressing mechanism.

Fig. 3 is a vertical sectional view of a feeding chute of the pressing mechanism, the section being taken on line 3—3 of Fig. 25 and viewed in the direction of the arrows at said line.

Fig. 4 is a horizontal sectional view showing the pressing mechanism, the section being taken on line 4—4 of Fig. 1 and viewed in the direction of the arrows at said line.

Fig. 5 is a vertical sectional view of one of the conveying chutes, the section being taken on line 5—5 of Fig. 4 and viewed in the direction of the arrows at said line.

Fig. 6 is a fragmentary plan view of the conveying chutes.

Fig. 7 is a vertical sectional view taken on line 7—7 of Fig. 6 and viewed in the direction of the arrows at said line.

Fig. 8 is a plan view of the delivery mechanism shown with certain parts omitted.

Fig. 9 is a fragmentary plan view on a larger scale of a portion of the delivery mechanism shown in Fig. 8, this view also having certain parts omitted and other parts in section.

Fig. 10 is a fragmentary perspective view of a portion of the delivery mechanism shown in Fig. 9 also with parts in section.

Fig. 11 is an enlarged sectional, perspective view of one form of a key card in its original condition.

Fig. 12 is a similar view of the same key card after being pressed by the devices of the present invention.

Figs. 13, 14 and 15 are all vertical sectional views of the delivery mechanism taken respectively on lines 13—13, 14—14 and 15—15 of Fig. 8 and viewed in the direction of the arrows at said lines.

Fig. 16 is a fragmentary elevational view of a portion of the delivery mechanism shown in Fig. 8.

Fig. 17 is a vertical sectional view of the change gear selector in the delivery mechanism, the section being taken on line 17—17 of Fig. 8 and viewed in the direction of the arrows at said line, the parts being shown in Fig. 17 on a larger scale than in Fig. 8.

Fig. 18 is a perspective view showing parts of the hopper actuating mechanism separated from their normal relative position.

Fig. 19 is a fragmentary perspective view of certain parts of the hopper actuating mechanism.

Fig. 20 is a vertical sectional view similar to Fig. 15 but showing the parts on a larger scale and showing certain parts in a different operating position.

Fig. 21 is a vertical sectional view of the hopper and associated parts, the section being taken on line 21—21 of Fig. 8 and viewed in the direction of the arrows at said line, the parts being shown in Fig. 21 on a larger scale than in Fig. 8.

Fig. 22 is a vertical sectional view of a portion of the delivery mechanism, the section being taken on line 22—22 of Fig. 8 and viewed in the direction of the arrows at said line.

Fig. 23 is a fragmentary perspective view of a portion of the delivery mechanism, the view showing certain parts separated from their normal relative position.

Fig. 24 is a fragmentary vertical sectional view of a portion of the delivery mechanism taken on line 24—24 of Fig. 8 and viewed in the direction of the arrows at said line, the view being similar to Figs. 15 and 20 but showing certain parts in a still different position of operation.

Fig. 25 is a fragmentary elevational view showing the vibrating feeding mechanism and feeding chutes of the pressing mechanism.

Fig. 26 is a fragmentary vertical sectional view showing the key card holding mechanism for feeding the pressing mechanism, the section being taken substantially on line 26—26 of Fig. 30 and viewed in the direction of the arrows at said line.

Fig. 27 is a fragmentary vertical sectional view taken on line 27—27 of Fig. 4 and viewed in the direction of the arrows at said line, the view being similar to Fig. 26 but showing a greater number of parts and a different position of the key card holding mechanism.

Fig. 28 is a partial fore and aft sectional view of the pressing mechanism taken on line 28—28 of Fig. 27 and viewed in the direction of the arrows at said line.

Fig. 29 is another partial fore and aft sectional view of the pressing mechanism taken on line 29—29 of Fig. 4 and viewed in the direction of the arrows at said line.

Figs. 30 and 31 are both partial fore and aft sectional views similar to Fig. 29 but showing fewer parts and respectively illustrating different positions of operation of certain parts of the pressing mechanism.

Fig. 32 is a fragmentary vertical sectional view showing the ejector mechanism of the pressing means, the section being taken on line 32—32 of Fig. 29 and viewed in the direction of the arrows at said line.

It has been found highly desirable to provide key cards for typewriting and like machines with a concave contact surface as such concavities facilitate the operation of the machine by conforming more fully to the shape of the ends of the operator's fingers. Heretofore the additional expense imposed by the prior concaving methods and the considerable amount of manual labor involved has restricted the general use of concave key cards.

It is accordingly a purpose of the present invention to provide a machine which operates automatically to concave the contact surface of key cards in an inexpensive and effective manner. In order to provide for full automatic operation of the machine, it is necessary to provide a means for arranging the key cards all in a uniform relation before they enter the pressing mechanism so that a concavity will be pressed into the same or contact face of each key card.

Generally stated, in the present machine the key cards are placed in a jumbled or entirely unrelated condition in a hopper which operates to automatically dispense the cards in a flat order but otherwise unrelated as the contact surfaces of some cards may be reversed relative to others. The cards then pass through a selecting means which operates to automatically turn only such cards as are dispensed by the hopper with the contact surface reversed. The cards thus arranged in a uniform order are delivered by a vibratory device into a plurality of chutes, each of the chutes conveying the cards to individual pressing devices all operating in unison. The pressing devices are heated and the cards are automatically fed thereto one at a time in timed relation with the hopper and selecting means, and after being pressed, the cards are discharged therefrom by an ejecting means also operating in timed relation with the pressing devices.

In the present instance the complete machine as illustrated in Fig. 1 is mounted on two spaced parallel base plates 35. It will be understood that any suitable driving means may be employed for the present machine, the means shown in the present instance including a speed reducing unit 36 mounted on spaced parallel cross plates 37 attached at 38 to the base plates 35. The speed reducing unit 36 may be of conventional construction wherein a driven shaft 39 turns at a suitably slower speed than a drive shaft 40 which carries a pulley 41 driven from a suitable source of power such as an electric motor or the like by a belt 42. One end of the driven shaft 39 carries a sprocket wheel 43 (see Fig. 4) for operating the card delivering means and the other end of the shaft carries a gear wheel 44 for operating the card pressing means.

The card delivering mechanism is mounted above the pressing mechanism by an upright supporting member 45 attached at 38 (see Fig. 4) to the ends of the cross plates 37, and as may be seen in Figs. 1 and 13, the upper end of the supporting member 45 is bent over at angles which afford a fore and aft inclination and also a lateral inclination of the delivering mechanism relative to the base 35. A base plate 48 is secured at 49 to the upper end of the supporting member 45.

*Hopper and actuating mechanism therefor*

The delivering mechanism which is mounted on the base plate 48 includes a hopper actuated and arranged to dispense the key cards in a flat order. The hopper and actuating mechanism therefor in the present instance is shown particularly in Figs. 8, 18 and 21, and includes a lower disc member 50 attached at 51 to a hub 52 which is provided with a bearing opening receiving the body portion of a stub shaft 53. The stub shaft 53 is provided with an annular shoulder portion 54 clamped against the upper surface of the base plate 48 by a nut 55 threaded on the lower end portion of the stub shaft 53 which extends through an opening in the base plate 48.

A second disc member 58 having a square central opening is mounted above the disc 50 and separated a distance therefrom which is slightly greater than the thickness of a key card by four radially arranged spacers 59 clamped in place by through bolts 60. A hopper shown in the present instance in the form of a four-sided square container 62 is mounted over the square opening in the upper disc 58, the container 62 being mounted by means of flange portions extending beneath the heads of the bolts 60.

A means is provided for intermittently rotating this hopper assembly about the stub shaft 53 which means in the present instance comprises an actuating disc 65 having an enlarged hub portion rotatively mounted around the shoulder portion 54 of the stub shaft 53 and bearing against the upper surface of the base plate 48. A ring 66 of frictional material, such as fibre, is secured at 67 to the upper surface of the actuating disc 65 and engages the lower surface of the lower hopper disc 50. A means is provided for obtaining the desired amount of frictional coupling between the hopper disc 50 and the frictional actuating ring 66 in the form of a spring 68 surrounding a reduced diameter upper portion of the stub shaft 53. The lower end of the spring 68 bears against a washer 69 engaging the upper end of the hopper hub 52, and the upper end of the spring 68 engages another washer 70 retained to afford the desired pressure by locking nuts 71 on the shaft 53. The tension of the spring 68 thus presses the hopper disc 50 against the frictional ring 66.

The actuating disc 65 is given an oscillatory motion during operation in the present instance through a radially extending actuating arm 74 (see Fig. 21) attached to the disc 65 at 75. The arm 74 is oscillated by a slide 76 (see Figs. 9, 19 and 21) guided for longitudinally reciprocating movement in a channel 77 in an upper base plate 78 attached at 79 (see Fig. 8) to the lower base plate 48. As shown in Fig. 19, the connection between the actuating arm 74 and the slide 76 is provided by a rounded end 74a of the arm 74 passing through an elongated opening 77a in the wall of the channel 77 and received in a closely fitting notch 76a in the slide 76.

The slide 76 is reciprocated through a link 80 pivotally connected to an upstanding bifurcated end 81 of the slide 76 and as shown in Figs. 8 and 9, the link 80 is also eccentrically connected at 82 to the face of a bevel gear 84. The bevel gear 84 is fixed at the extending end of a shaft 85 mounted in spaced bearing blocks 86 and 87 which are secured at 88 to the plate 48. A second bevel gear 90 meshes with the bevel gear 84 and is carried by a shaft 91 mounted in a bearing formed in a yoke extension 92 of the bearing block 86. As may be seen in Fig. 13, the shaft 91 extends substantially horizontally and at right angles to the shaft 85 although the shaft 85 is inclined fore and aft of the machine at approximately 45°, as may be seen from Fig. 1. A positive means is provided for driving the shaft 91 from the lower driven shaft 39 which in the present instance is shown in Figs. 1, 13 and 16 as comprising a chain 94 connecting the sprocket wheel 43 of the driven shaft 39 with a sprocket wheel 95 carried by the upper shaft 91.

Referring now to Figs. 8 and 21, it will be seen that the actuating disc 65 is given an oscillating movement, which due to the frictional ring 66, tends to correspondingly move the hopper assembly including discs 50 and 58 and the container 62. However, in the present instance, means are provided for permitting movement of this hopper assembly only in a single direction. Thus, a ratchet dog 98 is pivotally mounted at 99 in a slot in a guide plate 100 which is adjustably mounted at 101 on the plate 78. A contractile spring 102 extends between a pin 103 on the dog 98 and a pin 104 on the guide plate 100, whereby the inwardly turned end of the dog 98 is forced into one of a series of spaced notches 105 around the periphery of the upper disc 58. This arrangement permits the hopper assembly to rotate with the actuating disc 65 in a clockwise direction as the dog 98 will then be forced outwardly by the action of the wall of a notch 105 on a sloping portion 98a of the dog 98. The notches 105 are then spaced so that each clockwise direction of movement of the actuating disc 65 rotates the hopper assembly until the dog 98 enters the next adjacent notch and thus acts to prevent the counter-clockwise direction of rotation of the actuating disc 65 from effecting a corresponding counter-clockwise direction of rotation of the hopper assembly. The frictional coupling provided by the ring 66 permits the actuating disc to thus rotate in a counter-clockwise direction relative to the hopper assembly.

One form of key card or like article upon which the present machine may operate is shown in Fig. 11 and is designated as a whole by the reference letter C and which will be more fully described later. These key cards C are placed in a jumbled or entirely unrelated relation in the container 62 as shown for example in Fig. 8. As previously stated, the entire hopper assembly slopes at approximately 45° toward the front of the machine, and as the discs 50 and 58 and the container 62 are intermittently rotated, the key cards C will be agitated in a manner to turn or fall flat upon the disc 58 and move toward the lowest part of the outer edge thereof beneath the upper disc 58.

Referring particularly to Fig. 9, it may be seen that there is a guide plate 110 mounted above the plate 78 as for example by spot welding to the upper surface of the plate 78. The guide plate 110 is parallel to and spaced from the adjustable guide plate 100 to form a conveying chute for the key cards C. As the hopper assembly is intermittently rotated, the key cards C fall or slide from between the discs 50 and 58 in a flat relation down this chute or passageway between the plates 100 and 110.

In order to prevent the key cards C from falling out from between the discs 50 and 58, at any point except into above mentioned passageway, a guard in the form of a circular band 112 is provided around the edges of the discs 50 and 58. One end of the band 112 is secured at 113 to the edge of the plate 78 and the other portions thereof are supported by brackets 114 and 115 (see Fig. 8) extending outwardly from the base plate 48. The band 112 ends at the dog 98 and a short band 116 is attached at the end of the guide plate 100 to prevent the key cards from falling from between the discs 50 and 58 at this point. In the present construction, a top is provided over the passageway between the guide plates 100 and 110 in the form of a sheet 118 of transparent material, such as glass or Celluloid, and attached by screws 119 to the guide plate 110.

A resilient guide strip 120 is attached at 121 to the adjustable guide plate 100 and forms a resilient extension of the inner guiding edge of the plate 100. Likewise a resilient guide strip 122 is attached at 123 to the other side of the guide plate 100, which strip 122 extends inwardly below the end of the strip 120 to prevent any of the key cards which are out of their normal path of travel for any reason from falling over the edge of the base plate 78.

Referring to Fig. 11, it may be seen that the key card C in the present instance comprises a disc 125 of a suitable semi-compressible material such as cardboard or the like, which disc 125 has cemented thereto on one side a disc 126 of opaque Celluloid bearing a designating character of the typewriter such as a letter, numeral or punctuation mark. A third disc 127 which is of a smooth and transparent material such as clear Celluloid is cemented over the opaque disc 126 and forms the contact surface of the key card. The key card C shown in Fig. 11 is in its original condition as placed in the container 62 of the present machine.

*Card delivery means*

It will be noted in Figs. 8 and 9 that the key cards C are dispensed from the hopper mechanism in a flat order but that certain of the cards may have their contact surface 127 exposed while others have the cardboard surface 125 exposed. Accordingly, there are delivery means provided in the present machine acting on the key cards C as they come from the passageway between the two guide plates 100 and 110 to automatically arrange the cards so that their contact surfaces 127 all face in the same direction before entering the pressing means. Generally stated, this delivery means comprises a feeding mechanism for feeding the cards one at a time into the path of a selecting finger which coacts with the exposed surface of the card. This selecting finger functions to automatically move those cards only which have the relatively rough cardboard surface 125 exposed into one chute or conveying means, and to allow those cards which have the relatively smooth Celluloid surface 127 exposed to fall into another chute or conveying means. The two chutes or conveying means are so arranged that the cards falling into one chute are turned in one direction to roll on their edges and the cards falling into the other chute are turned in the other direction to also roll on their edges, as will hereinafter more clearly appear. Thus, the cards will come from both chutes with their contact surfaces all in the same relative order.

In the present instance a change gear arrangement shown in Figs. 8 and 9 is provided for operating the delivery mechanism at a selective rate. Thus, a shaft 130 is carried by the bearing blocks 86 and 87 in spaced parallel relation to the shaft 85. There are three different size gear wheels 132, 133 and 134 fixed in spaced relation on the shaft 85, 132 being the high speed gear, 133 being the low speed gear and 134 being the intermediate speed gear. The shaft 130 also carries three different size gear wheels 136, 137 and 138 which are of proper size to mesh with the companion gears 132, 133 and 134 respectively splined on the shaft 85. That is to say, the gears 136, 137 and 138 are each provided with a key or projection (not shown) entering a longitudinal groove 139 in the shaft 130, whereby these gears may be moved longitudinally of the shaft 130 but cannot rotate relative thereto.

The three gears 136, 137 and 138 are arranged side by side on the shaft 130 and means are provided for shifting the gears longitudinally of the shaft 130 and for retaining them in their shifted position. This means is herein shown as comprising two parallel bars 140 and 141, the bar 140 having an opening receiving the shaft 130 and positioned adjacent the outer surface of the gear 136 and the bar 141 has an opening receiving the shaft 130 and positioned adjacent the outer surface of the gear 138. The bars 140 and 141 are held in spaced relationship by bolts 142 passing through spacing sleeves 143.

In order to retain the gears 136, 137 and 138 in their longitudinally adjusted position on the shaft 130, the bar 141 is provided with a depending lug 141a (see Fig. 17) which may enter any one of three notches 144, 145 or 146 in the edge of the guide plate 110 accordingly as it is desired to select a high, low or intermediate speed for shaft 130. As shown in the drawings, the lug 141a is in notch 146 which meshes gear 138 with gear 134 to provide an intermediate speed for the shaft 130. Although this rather simplified change gear construction has been shown in the accompanying drawings, it will be understood that various other means may be employed for varying the rate of speed of the delivery mechanism.

*Card feeding mechanism*

The delivery means driven by the shaft 130 in the present instance includes a feeding slide 150 employed to feed the key cards one at a time into the path of the selecting means. Referring to Figs. 8, 9, 10 and 14, it may be seen that the feeding slide 150 is guided for longitudinal reciprocal movement between the lower edge of the guide plate 110 and the upper edge of the stop plate 152 located by dowel pins 153 on the base plate 78. An L-shaped cover plate 154 is attached to the plates 110 and 152 by screws 155 threaded into the base plate 78, the cover plate 154 acting to hold the slide 150 upon the upper surface of the base plate 78.

A stop slide 157 is also provided for positioning the key cards as they are acted upon by the selecting means. As may be seen in Figs. 8, 9, 10 and 15, the stop slide 157 is guided for longitudinal reciprocal movement parallel with the feeding slide 150 between the lower edge of the stop plate 152 and the upper edge of a similar plate 158 which is located by dowel pins 159 on the base plate 78. The stop slide 157 is retained upon the upper surface of the base plate 78 jointly by the lower end portion of the L-shaped cover plate 154 and by a selector plate 160 (see Fig. 8) attached by screws 161 threaded into the base plate 78.

The feeding slide 150 and the stop slide 157 are operated in unison through an operating member 163 which is pivotally connected at one end to an intermediate diameter portion of a connecting bolt 164 which operably connects the enlarged ends of the two slides 150 and 157. As may be seen in Figs. 8 and 9, a small diameter portion of one end of the connecting bolt 164 extends through an opening in the feeding slide 150 and is retained therein by a nut 165 threaded thereon. In a similar manner, a small diameter portion at the other end of the bolt 164 extends through an opening in the stop slide 157 and is retained therein by a nut 166 threaded thereon. Referring to Figs. 8 and 14, it may be seen that the operating member 163 is provided with an enlarged opening receiving a reduced diameter portion of an eccentric 168 attached at 169 to the shaft 130, whereby the slides 150 and 157 are given a longitudinally reciprocating movement by rotation of the shaft 130.

The slides 150 and 157 are shown in Fig. 8 in their retracted position which allows the key cards C to slide downwardly along the edge of the guide plate 110 until the lowermost card rests against the upper edge of the stop plate 152. As the slides 150 and 157 are operated inwardly toward their position shown in Fig. 9, it will be clear that the lowermost card C will be moved outwardly by the end of the feeding slide 150 to a position clearing the end of the stop plate 152, whereupon it slides downwardly along the edge of the stop plate 152 to a position X (see Fig. 9) wherein it is stopped by engaging the side of the stop slide 157 which has now moved to its position shown in Fig. 9.

As the slides 150 and 157 are operated back toward their retracted position shown in Fig. 8, it will be clear that the stop slide 157 will move out of the path of any card which may be still resting thereagainst, and the feeding plunger 150 will allow the cards to slide downwardly along the guide plate 110 until another card engages the upper edge of the stop plate 152. Thus, it will be seen that the slides 150 and 157 operate to successively feed the cards C one at a time into position X whereupon they are operated on by the selecting mechanism which will now be described.

*Card selecting mechanism*

The selecting mechanism is shown particularly in Figs. 15, 20 and 24, wherein it may be seen that a selecting finger 170 is provided and arranged for reciprocating movement in a slot of a guide block 172 mounted above the L-shaped cover plate 154 by screws 173 threaded into the base plate 78 (see Figs. 8 and 20). One end of the selecting finger 170 is attached at 174 to a depending operating head 175 which is pivotally connected at 176 to an eccentric point on the side of a cam member 178 secured at 179 (see Fig. 8) to the end of the shaft 130.

The normal or starting position of the selecting finger 170 is shown in Fig. 15 wherein it may be seen that a depending cam portion 170a on the lower edge thereof rests on the bottom wall of the slot of the guide block 172 and holds a downwardly extending pointed end portion 170b of the selecting finger 170 in its upper position out of engagement with the selector plate 160. As the selecting finger 170 is moved forward toward its position shown in Fig. 24 by rotation of the cam member 178 in a counter-clockwise direction, the portion 170a is moved clear of the bottom of the slot of the guide block 172 just as the pointed end portion 170b passes over and above the beveled edge portion 160a of the selector plate 160.

The operation of the feeding slide 150 and the stop slide 157 has a definitely timed relation to the operation of the selecting finger 170, so that before the selector finger 170 reaches its position shown in Fig. 24, the stop slide is projected to a position arresting a key card C in position X as shown in Fig. 9. As the selecting finger 170 moves forwardly, the pointed end portion 170b is lowered by the cam portion 170a over the beveled edge portion 160a of the selector plate 160, and engages the upper surface of the key card C which is positioned at X by the stop slide as shown in Fig. 24.

In the present instance, the end portion 170b of the selecting finger 170 is spring pressed into engagement with the exposed surface of the key card C. Thus, a bell crank 185 (see Fig. 20) is pivotally mounted at 186 in the slot of the guide block 172, and is provided with an enlarged portion 187 at the end of its laterally extending arm which engages the upper edge of the selecting finger 170. The upwardly extending arm of the bell crank 185 is connected to one end of a contractile spring 190 which is anchored at its other end to an adjustable rod 191. A square portion 191a of the rod 191 is received for longitudinal adjusting movement in a square opening in an enlarged end 192 of a bracket 193 which is mounted at 194 upon the end of the bearing block 87. A knurled adjusting nut 195 is threaded on the end of the rod 191 and is provided with a hollow extending sleeve portion 195a engaging the side of the enlarged end 192 of the bracket 193. The tension of the spring 190 may thus be readily varied to vary the contacting force of the end portion 170b of the selecting finger upon the surface of the key card C.

The principle of operation of the selecting finger 170 may be generally stated as follows. When the end portion 170b of the selecting finger coacts with the Celluloid surface 127 of a key card, there is a very small amount of frictional resistance to the movement of the selecting finger across this surface and furthermore, there is considerable frictional resistance to the movement of the cardboard surface 125 upon the surface of the base plate 78. However, when the end portion 170b coacts with the cardboard surface 125 of a key card, there is considerable frictional resistance to the movement of the selecting finger across this surface and there is very little frictional resistance to the movement of the Celluloid surface 127 upon the surface of the base plate 78. Accordingly, the tension of the spring 190 is so adjusted that when the Celluloid surface of the key card is exposed, the selecting finger moves thereacross without moving the key card, but when the cardboard surface is exposed the card moves with the selecting finger upon the surface of the base plate 78.

*Card holding mechanism*

It has been found in practice that there is sometimes a slight lip or turned up portion formed around the very outer edge of the Celluloid surface 127 of the key cards C when the cards are being cut or stamped from the sheet material. Accordingly, there are means provided in the present machine for preventing a key card having its Celluloid surface exposed from being improperly moved by selecting finger due to the engagement of the end of the selecting finger with this lip or turned up portion at the edge of the card. Thus, when the end 170b of the selecting finger reaches a point near the edge of the key card such as shown in Fig. 20, a holding means becomes effective to retain the key card in position X, providing of course that the Celluloid surface 127 of the card is exposed so that it has not been previously moved out of position X by the selecting finger.

The specific construction of this holding means provided herein is best shown in Figs. 9, 15, 20 and 24. A holding plunger 200 is mounted for longitudinal, vertical movement in an opening through the base plate 78 located beneath the selecting finger 170 and having its axis at the edge of the stop block 152 as may be seen in Fig. 9. The plunger 200 is pressed downwardly under the force of an expansion spring 201 acting between the lower side of the base plate 78 and an enlarged head 202 at the lower end of the plunger 200. The force of spring 201 is normally resisted by a timed operated controlling arrangement including an arm 204 having one end entering a slot in the lower side of the head 202 of the plunger 200 and having its other end attached at 205 to a hub member 206 (see Fig. 9). A second arm 207 extending in the opposite direction from the arm 204 is also attached at one end, at 205, to the other end of the hub member 206 and the other end of this second arm 207 engages the outer edge of the cam member 178. The hub member 206 is pivotally mounted on a shaft 208 retained in the bifurcated lower end of a bracket 209 mounted at 210 upon the base plate 78.

There is a holding or clamping notch 200a provided in the upper portion of the plunger 200, through which notch 200a the edge of the key card may freely pass when the plunger 200 is in its normal position as shown in Figs. 15 and 24. The plunger 200 is retained in this normal position against the force of the spring 201 by the engagement of the end of arm 207 with the periphery of the cam disc 178. However, when the end portion 170b of the selecting finger 170 has passed over the central portion of the Celluloid surface 127 of key card and reaches a position approximately as shown in Fig. 20, a notch 212 in the edge of the cam disc 178 reaches a position allowing the end of the arm 207 to move upwardly and the plunger 200 to move downwardly under the force of the plunger spring 201.

The upper wall of the notch 200ᵃ in the plunger 200 is undercut as shown in Fig. 20 to engage and securely hold the key card in position X as the end 170ᵇ of the selecting finger 170 passes over the edge of the Celluloid surface of the key card. Thus, it will be clear that if there is a lip or raised edge around the Celluloid surface of the key card, the holding plunger 200 will prevent movement of the key card by the engagement of the end 170ᵇ of the selecting finger with such lip.

It should be understood that the holding plunger 200 is only effective on key cards having their Celluloid surfaces exposed, as when the cardboard side is exposed, the selecting finger will have moved the card out of the notch 200ᵃ before the plunger 200 is allowed to move downwardly by the notch 212 in the cam disc 178. As soon as the end of the selecting finger has passed over the edge of the key card, the notch 212 of the cam disc 178 passes the end of the arm 207 to again raise the plunger 200 and release the key card from the holding notch 200ᵃ.

When the selecting finger 170 reaches its extreme forward, operated, position, such as shown in dotted lines in Fig. 20, it will be noticed that its right-hand end has been lowered by the counter-clockwise rotation of the disc 178 thus causing a pivotal movement of the finger upon the bottom wall of the slot in the guide block 172 which raises the pointed end 170ᵇ clear of a key card which may have been moving therewith. The finger is then retracted by a continued counter-clockwise rotation of the disc 178, during which movement it will be clear that the end 170ᵇ will be further elevated in the same manner and will be out of path of a key card which was not moved by the forward motion thereof. When the finger 170 approaches its fully retracted position shown in Fig. 15, the depending portion 170ᵃ rides upon the bottom wall of the slot in the guide block 172 and raises the end portion 170ᵇ clear of the selector plate 160.

It will now be clear that the selecting mechanism operates on each card as it is positioned at X by the stop slide 157 to move the card transversely of its normal path of travel if its cardboard side is exposed but to allow the card to remain in its normal path of travel if the Celluloid or contact surface thereof is exposed.

*Card turning and conveying means*

If the card is moved transversely of its normal path of travel by the selecting finger 170, said card passes over the side edge of the base plate 78 and turns to fall on its edge upon a conveying plate 215 which is attached at 216 (see Fig. 22) beneath the base plate 78. However, if the card is not moved transversely by the selecting finger 170, then the card continues in its normal path along the edges of the plates 152 and 158 as soon as the stop slide 157 is withdrawn from its path. After passing the stop slide 157, the card turns partially toward its edgewise position due to a sloping depression 218 (see Fig. 10) in the base plate 78, and upon passing the lower edge of the base plate 78, the card completes this turning movement to an edgewise position and falls on its edge on the conveying plate 215.

It may be seen from Figs. 8 and 9 for instance, that a card having its cardboard surface exposed which is moved transversely by the selecting finger will turn in one direction in falling to its edgewise position on the plate 215 while a card having its Celluloid surface exposed will turn in the other direction in falling to its edgewise position on the plate 215. In other words as viewed in Figs. 8 and 9, the left-hand edge of a card having the cardboard side exposed will fall downwardly over the side edge of the plate 78 so that its Celluloid surface will be on the right when it reaches its edgewise position. Likewise, the Celluloid surface wil be on the right when a card having its Celluloid side exposed reaches its edgewise position as its right-hand edge will turn downwardly due to the sloping depression 218 in the base plate 78. It will be understood, therefore, that all of the cards, due to the turning thereof above described, have their Celluloid faces presented in the same direction.

The cards are retained in a separated edgewise position as they roll down the conveying plate 215 by a central separating strip 220 and side guide strips 221 and 222, all of the strips 220, 221 and 222 being attached in a suitable manner, such as at 223, upon the upper surface of the conveying plate 215 as may be seen in Fig. 23. Thus, two separate chutes or conveying channels are formed for conveying the cards on their edges as they leave the selecting mechanism. Sloping portions 220ᵃ and 221ᵃ are provided at the upper ends of the strips 220 and 221 respectively which taper downwardly and aid in guiding the key cards to their upright edgewise position.

The key cards continue to roll on their edges in continuations of these chutes or channels which slope downwardly to the lower pressing mechanism. Thus, as may be seen in Figs. 1, 6 and 7, there are two strips 230 and 231 joined at their upper ends to the lower end of the conveying plate 215 by a connecting plate 232. The connecting plate 232 is attached at 233 to the conveying plate 215 and at 234 to the strips 230 and 231, and thus holds the strips 230 and 231 in the positions shown in Fig. 6 which are respectively opposite but extending at an angle relative to the lower ends of the card conveying channels formed on the plate 215 by the strips 220, 221 and 222. These conveying strips 230 and 231 form the bottoms of conveying channels and side guides are provided by respective strips 237 extending upwardly from each side of each of the bottom strips 230 and 231. The side strips 237 may be of a transparent material such as Celluloid and they are retained at each side of their respective bottom strips 230 and 231 by through bolts 238 with respective narrow metal strips 239 provided between the heads and nuts of the bolts 238 and the strips 237.

The strip 230 extends downwardly above the strip 231, and the lower ends of both strips 230 and 231 are attached in the manner shown in Fig. 5 to the upturned edge of a feeding chute 245 of the pressing mechanism. Referring to Fig. 5, the lower through bolt 238 of each of the strips 230 and 231 passes through an opening in a respective lip 245ᵃ formed by an inwardly bent portion of the chute 245. The feeding chute 245 is curved as shown in Figs. 1, 4 and 5, and is mounted in an inclined position upon a feeding table 246 of the pressing mechanism. Suitable brackets such as 247 and 248 may be employed for supporting the chute 245 on the table 246 as shown in Figs. 1 and 4.

Thus, it may be seen that all the key cards C are conveyed from the selecting mechanism in the two channels with their contact or Celluloid surfaces all facing in the same relative direction, and as the cards roll from the lower ends of the two conveying channels, they slide down the curved inclined upper surface of the chute 245 in a flatwise order wherein their contact surfaces will all still have the same relation. In the present instance, the contact or Celluloid surfaces of all of the key cards will face upwardly as they slide down the feeding chute 245 into the pressing mechanism.

*Card pressing means*

The pressing mechanism in the present instance operates to form a permanent concavity in the contact or Celluloid surface of the key cards. A specific construction of a mechanism for thus forming the key cards has been shown in the accompanying drawings, but it is to be understood that various other types of pressing mechanism may be employed as well and that various modifications and refinements may be made in the present construction.

Referring particularly to Figs. 1, 2 and 4, it will be seen that the pressing mechanism in the present instance comprises a rectangular frame 250 which is secured upon the two base plates 35 at 251. A stationary pressing member 252 is mounted at 253 (see Figs. 27 and 28) transversely of the front end of the frame 250 and is adjustable longitudinally of the frame as will be described hereinafter. The lower ends of two table supporting brackets 255 (see Figs. 1 and 2) are respectively attached at 256 to the opposite ends of the stationary pressing member 252, and the brackets 255 extend upwardly and forwardly to support the feeding table 246. The upper ends of the brackets 255 are formed around the outer edges of the table 246 to provide a ledge 246ª as may be seen in Figs. 2 and 4, and the table may be secured to said brackets by suitable means, as by spot welding. A rear corner portion 246ᵇ of the table 246 which is at the lower end of the feeding chute 245 is bent downwardly between the brackets 255 and extends to the top of the stationary pressing member 252 as may be seen in Figs. 3, 4, 25 and 29.

*Shaker mechanism and conveying channels*

In the present instance, the key cards C slide from the lower end of the feeding chute 245 into a vibratory or shaker mechanism which operates to distribute the cards into a plurality of individual conveying channels leading to the various simultaneously operating pressing dies. Although various numbers of simultaneously operating pressing dies may be employed, there are five shown in the present embodiment and accordingly there are five channels branching from the shaker mechanism as may be seen in Fig. 25.

The shaker mechanism as shown in Figs. 3 and 25 includes a plate 258 mounted for oscillating movement in an opening 259 in the depending portion 246ᵇ of the table 246. The upper edge of the plate 258 underlies the portion 246ᵇ of the table 246 above the opening 259, while the lower edge of the plate 258 overlaps the portion 246ᵇ below the opening 259. A guide strip 260 (see Fig. 3) is suitably attached along the bottom portion of the plate 258 and is recessed to receive the upper edge of the table portion 246ᵇ below the opening 259. A cover plate 261 of transparent material such as Celluloid is mounted a suitable distance above the plate 258 to accommodate the key cards therebeneath and is secured by screws 262 passing through side spacing strips 263 into the plate 258. The spacing strips 263 form side walls for the shaker, and the upper ends of these strips 263 are notched to receive the table portion 246ᵇ above the opening 259 as may be seen in Fig. 3, whereby the shaker is retained within and is guided for longitudinal reciprocating motion in the opening 259.

The means shown herein for actuating the shaker includes a link 265 pivotally connected at 266 to the plate 258 and pivotally connected at 267 to a depending arm of a bell crank 268. The bell crank 268 is pivotally mounted at 269 in the bifurcated end of a bracket 270 attached at 271 to the side of one of the table supporting brackets 255. An outwardly extending arm of the bell crank 268 is pivotally connected at 273 to an actuating rod 274 which extends downwardly and rearwardly along the side of the pressing mechanism as shown in Fig. 2. The rod 274 is operated as may be seen in Fig. 2 to impart a reciprocating motion to the shaker from an eccentric pivotal connection 275 at the end of a main operating shaft 277 of the pressing mechanism. The main shaft 277 is mounted as shown in Fig. 4 in suitable spaced bearings 278 secured on the frame 250 at 279 and is driven at a reduced speed through a large gear wheel 280 attached thereto in mesh with the gear wheel 44 of the drive unit 36.

There are suitable guide strips 282 attached at 283 to the depending table portion 246ᵇ, which strips serve to guide the key cards into the upper end of the shaker. It will also be noticed in Figs. 4 and 25 that the feeding chute 245 is mounted at one side of the opening in the receiving end of the shaker which allows key cards to be fed manually from the table 246 into the shaker if desired for any reason, such as a failure or breakdown of the delivering mechanism.

As previously stated, there are five conveying channels in the present instance into which the key cards are distributed by the shaker mechanism. These conveying channels are formed by six guide strips 285 attached in spaced relation at 286 upon the depending table portion 246ᵇ. The upper ends of these guide strips 285 are pointed and triangular in shape as shown in Fig. 25 to form channels which spread or branch outwardly from the lower end of the shaker plate 258, and as may be seen in Figs. 27 and 29, the lower ends of the strips 285 extend down to the top surface of the stationary pressing member 252. The lower straight portion of each of the channels thus formed is substantially vertical as may be seen in Fig. 29, and to retain the key cards in this portion of each of the channels, there are retaining strips 287 attached at 288 to the outer surfaces of the respective guide strips 285. As may be seen in Figs. 25 and 27, these retaining strips 287 are of a sufficiently greater width than the guide strips 285 to overlap the edges of the key cards as they are guided in the channels between the strips 285. The key cards are thus fed downwardly through the five separate channels formed by the strips 285 to the stationary pressing member 252.

*Pressure applying mechanism*

Referring to Figs. 4, 29 and 32, it may be seen that the pressure applying mechanism includes a movable die-carrying member 290 which is mounted for longitudinal movement upon the pressing frame 250 by a central channel 291 receiving a guide bar 292 rigidly secured at 293

(see Fig. 32) to the central portion of the frame 250. The member 290 is provided with outwardly extending flanges 294 which slide in milled out portions of stationary guide blocks 295 secured to the frame 250 at 296, whereby the member 290 is retained on the frame 250 and further guided in its longitudinal movement.

The movable die-carrying member 290 is operated by two spaced cams 298 rigidly secured to the main operating shaft 277, as may be seen in Fig. 4. The two cams 298 are identical in their profiles which is shown in Fig. 2 and are fixed in the same relation on the shaft 277. Each of the cams 298 coacts with a companion roller 299, each of said rollers being rotatively mounted on a shaft 300 (see Fig. 29) in recessed portions at the rear of the movable die-carrying member 290. The member 290 is spring pressed rearwardly to hold the rollers 299 in contact with the cams 298 by an expansion spring 301 (see Fig. 4) extending from a central upstanding lug 302 at the rear of the member 290 to a stationary cross bar 303 mounted at 304 upon upward extensions 305 of the guide blocks 295. A rod 306 attached at the central portion of the cross bar 303 extends through the center of the spring 301 and is movable freely in an opening in the lug 302.

There are as previously mentioned five dies provided in the movable member 290 which coact respectively with five plungers in the stationary pressing member 252 to shape or concave the key cards as they are delivered thereto from the respective feeding channels. Referring to Fig. 29, the dies of the movable member 290 each comprises an enlarged diameter body portion 310 surrounded by an insulating sleeve 311 which is received in an opening in the member 290. Each of the dies 310 is retained in position by companion screw 312 extending through a threaded opening in the member 290 and through an opening in the sleeve 311 with its lower end engaging the sloping wall of a notch in the respective die 310, whereby the die and its sleeve 311 are forced inwardly against a washer 313.

A concentric opening in the body portion 310 of each die receives an electrical heating unit 316 having lead wires 317 extending through an L-shaped passage 318 to the outside of the machine where they are connected to a suitable source of electrical current for heating the units 316. A portion 310ᵃ of each of the dies 310 projects from the die-carrier 290 and is of a reduced diameter which is shaped at its outer end to effect the desired shaping of the contact surface of the key card. A vent 319 is provided in each of the dies 310 extending from the heating unit 316 to the outside of the die.

There are five plungers 320 mounted for longitudinal movement in companion sleeves 321 which are received in respective openings in the stationary pressing member 252. The sleeves 321 rest against respective washers 322 at the end of the openings in the member 252. There are vents 323 provided in each of the sleeves 321 which communicate with vents 324 in the stationary member 252 and prevent trapping of air at the rear of the plungers 320 during the longitudinal rearward movement thereof.

The plungers 320 are all operated longitudinally through a predetermined distance during operation of the movable die-carrying member 290 by companion connecting rods 325 which are suitably attached to the inner ends of the plungers 320. The connecting rods 325 extend through respective openings in the washers 322 and in the stationary member 252 to the forward end of the frame 250, and are all secured at their outer ends to a cross bar 326 at 327, as shown in Figs. 4 and 30. The cross bar 326 is operatively connected at each end to respective operating rods 328 which are carried by outwardly extending portions 329 of the movable die-carrying member 290, as shown in Figs. 4 and 27.

There are nuts 330 provided on the operating rods 328 (see Fig. 28) against which the cross bar 326 is normally pressed by companion expansion springs 331 mounted on the operating rods 328 between the cross bar 326 and respective collars 332 attached to the rods 328 at 333. It will thus be seen that for purposes to be later described, the connection between the operating rods 328 and the cross bar 326 permits the rods 328 to move relative to the cross bar 326 when the operating rods 328 are pushing forwardly or outwardly on the cross bar 326 if such motion of the cross bar is resisted.

The stationary member 250 is heated to the desired temperature in the present instance by two electrical heating units 335 (see Figs. 27 and 28) which are received in vertical openings in the member 250. These units 335 may be similar to the units 316 employed in the movable dies 310, and are provided with lead wires 336 which are connected to a suitable source of electrical current in the same manner as the lead wires 317.

In order to convey the key cards into the interior of the sleeves 321 of the stationary member 252, a portion at the upper end of the member 252, which is directly below the ends of the guide strips 285, is cut away, and as may be seen in Fig. 29, the upper half of each of the sleeves 321 is likewise cut away. Referring to Figs. 27 and 28, it may be seen that a guide plate 340 is mounted by screws 341 and dowel pins 342 in the cut away portion of the member 252. This guide plate 340 is provided with channels 343 cut in the inside vertical surface thereof, which channels 343 align with and form a continuation of the channels formed between the guide strips 285 on the depending table portion 246ᵇ. As may be seen in Figs. 27 and 29, there are semi-circular portions cut out of the lower edge of the guide plate 340 to allow an outward movement of the plungers 320.

The key cards C are thus conveyed in five individual channels to the interior of the five sleeves 321 in the stationary member 252. In Fig. 29, the movable die-carrying member 290 is shown in its fully retracted position effected by the rollers 299 engaging the low portion of the cams 298, as shown in Fig. 2. The member 290 in this retracted or rearward position, positions the plungers 320 through the operating rods 328 and connecting rods 325 also in an extreme rearward position as shown in Fig. 29, and in such position the upper sides of the plungers 320 are engaged by the lowermost key card in the respective channels in the guide plate 340.

As the movable member 290 is operated forwardly by rotation of the cams 298, the plungers 320 are also operated forwardly or inwardly in the associated sleeves 321 through the springs 331 connecting the operating rods 328 with the cross bar 326 as the resistance to such movement of the plungers is not sufficient to effect a compression of the springs 331. When the member 290 and the plungers 320 are thus operated without relative movement to a position shown in Fig. 30, it may be seen that the lowermost key card in each of the five channels in the guide plate 340 will fall into the associated sleeve 321 in the space between the ends of the plungers 320 and the dies 310.

*Card feeding means for pressing mechanism*

There is in the present arrangement a holding means provided for preventing the next key card in each of the channels from following the lowermost card as it thus drops into the companion sleeve 321 in order to prevent said next card from possible damage as the lowermost card is being pressed. Referring to Figs. 4, 26, 27, 29 and 30, it may be seen that this holding means comprises five horizontal holding plungers 348 retained in spaced relation in openings in the movable die-carrying member 290 by screws 349. These holding plungers 348 are positioned above and at the right of the dies 310 and move with the member 290 in openings 350 registering therewith in the guide plate 340 and in the stationary member 252. As may be seen in Figs. 26 and 27, the openings 350 are positioned so that the plungers 348 as they move forwardly therein pass between the curved side edges of two adjacent key cards thus preventing the upper card from falling when the lower card moves from its path. It will be noticed in Fig. 30 that when the plungers 320 have moved forwardly to allow the lowermost card to fall into the sleeve 321, the holding plungers 348 have moved forwardly to block the next card as shown in Fig. 26.

*Operation of pressing mechanism*

The actual pressing operation of the key cards C may be explained with reference to Figs. 30 and 31 wherein it may be seen that the key cards C after entering the sleeves 321 are carried forwardly into the interior thereof between the plungers 320 and the dies 310 by a continued rotation of the cams 298. However, there is no pressure exerted on the surfaces of the cards during this forward movement into the sleeves, but toward the end of this forward movement of the dies 310, the inner ends of the plungers 320 engage the respective washers 322 at the end of the sleeves 321 and the plungers are thus arrested against further forward movement. It will then be clear that the remaining forward movement of the dies 310 will be relative to the plungers 320 as allowed by compression of the springs 331, thereby pressing the key cards between the ends of the portions 310$^a$ of the movable dies and the ends of the plungers 320.

The ends of the plungers 320 are flat in the present instance to afford a smooth support for the back or cardboard side 125 of the key cards while the end of the die portion 310$^a$ is shaped to provide the desired depression or concavity in the contact or Celluloid surface 127 of the key cards. It has been found that materials such as Celluloid may be permanently deformed or shaped without fracture or other damage thereto when the dies or shaping means are heated. Accordingly, the dies 310 are maintained at the desired temperature by the electrical heating units 316 and to aid in heating the Celluloid of the cards as well as to prevent excessive cooling of these dies 310 while operating within the sleeves 321, the stationary member and the parts carried therein are also heated by the electrical heating units 335.

Referring to Figs. 29 and 31 it will be seen that the central portion of the end of the die portions 310$^a$ are convex to thereby form a concavity in the central portion of the contact surfaces 127 of the key cards as they are pressed thereby when the dies and plungers reach a position such as shown in Fig. 31. It will also be observed that there is an annular raised ring around the very outside of the ends of the die portions 310$^a$ which forms a depressed annular ring around the outside of the contact surface 127 of the key card during the pressing operation. The key cards C after being pressed by the operation of the dies 310 and plungers 320 to the positions shown in Fig. 31 will then be permanently formed on their contact surfaces 127 in the shape shown in Fig. 12.

A particular feature of the present pressing means is the arrangement of the plungers 320 to carry the key cards into the interior of the sleeves 321 before pressure is exerted on the contact surfaces of the cards. With this arrangement, the inner walls of the sleeves 321 provide a support for the edges of the key cards and prevent the diameter of the card from enlarging and the edges from damage during the pressing operation.

In the present arrangement, it will be clear that the amount of movement of the dies 310 after the plungers 320 have been arrested by engagement with the washers 322 will determine the extent to which the key cards are pressed. It will be clear that this extent of pressing should be closely regulated and as key cards of different original thicknesses may be required, the point of arrest of the plungers 320 during the movement of the dies 310 is herein made variable by adjusting the member 252 longitudinally on the frame 250.

Referring to Figs. 4, 27 and 28, it may be seen that this adjustment of the member 252 is provided by a wedge-shaped member 360 extending transversely of the frame 250 against the rear vertical edge of an upstanding portion 361 at the front of the frame 250. The rear side of the wedge-shaped member 360 is received in a groove in the front vertical edge of the member 252, the wall of which groove tapers in accord with the taper of the wedge-shaped member 360. Thus, a longitudinal movement of the wedge-shaped member 360 will effect a slight movement of the member 252 longitudinally on the frame 250.

Referring to Fig. 27, an adjusting screw 365 is provided for effecting the adjusting movement of the wedge-shaped member 360. The adjusting screw 365 is threaded into an opening in the end of the wedge-shaped member 360, and is provided with an enlarged head 366 and a shoulder 367. Longitudinal movement of the screw 365 is prevented by a bracket 368 secured at 369 to the frame 250 and having a bifurcated upper end receiving the body portion of the screw 365 between the head 366 and the shoulder 367.

The member 252 is retained on the frame 250 by screws 253 as previously stated, which screws are loosened when the member 252 is being adjusted, and as may be seen in Fig. 27, the screws 253 pass through elongated slots in the member 252 which allow this adjusting movement thereof. The member 252 is guided in its longitudinal adjusting movement by a central channel 374 (see Fig. 27) receiving a guide bar 375 attached at 376 on the top of the frame 250.

After the key cards have been pressed by the movable die-carrying member 290 in its extreme forward position shown in Fig. 31, the continued rotation of the cams 298 allows the member 290 to move rearwardly under the force of the spring 301. During the initial portion of this rearward movement of the member 290, the plungers 320 are not moved until the space between the cross bar 326 and the nuts 330 on the operating rods 328 is taken up, and thereafter the end portions 310ª of the dies are further separated from the ends of the plungers 320. The plungers 320 are then moved rearwardly in unison with the member 290 to the extreme position shown in Fig. 29, whereby the pressed key cards are fully withdrawn from their respective sleeves 321. The key cards are then free to fall downwardly through an opening 380 in the frame 250 and may be received by a suitable container (not shown).

Card ejecting mechanism

It has been found that when the plungers 320 have thus moved the key cards out of the sleeves 321, the cards occasionally will adhere either to the ends of the plungers 320 or to the ends of the dies 310 and will be carried back into the sleeves 321 upon the next cycle of operation. Accordingly, means are herein provided for forcefully ejecting the key cards when they are withdrawn from the sleeves 321.

Referring to Figs. 29 and 32, it will be seen that there are five ejector slides 385 mounted to move downwardly past the ends of the respective plungers 320 when the latter are withdrawn to their extreme positions shown in Fig. 29. The ejector slides 385 are mounted for vertical movement in the respective channels in a cross bar 386 wherein they are retained by a cover plate 387 secured to the bar 386 by screws 388. The extreme opposite ends of the cross bar 386 are secured at 389 to respective upright brackets 390 which are attached at their lower ends to the forward ends of the guide plates 295 at 391. The upper ends of the ejector slides 385 are all secured to a common connecting bar 392 by respective screws 393 and dowel pins 393ª.

Each end of the connecting bar 392 is pivotally connected at 394 to one end of an associated link 395, the other end of each of the links 395 being pivotally connected at 396 to associated forwardly extending operating arm 397 carried by a rock shaft 398. The rock shaft 398 is mounted in three spaced bearing blocks 399 (see Fig. 4) which are mounted at 400 on a stationary cross bar 401. The cross bar 401 is in turn mounted at 402 upon the ends of upstanding portions 403 of the extensions 305 which are carried above the respective guide blocks 295.

A depending arm 405 secured to the left-hand end of the rock shaft 398 carries a roller 406 which coacts with the periphery of a cam disc 407 (see Fig. 2) secured to the left-hand end portion of the main operating shaft 277. The depending arm 405 is spring pressed to hold the roller 406 against the edge of the cam disc 407 through a rod 408 having its rearward end portion entering a depression in the arm 405 and passing freely through an opening in a bracket 409 attached at 410 to the left-hand end of the transverse bar 303 to extend laterally therefrom. A rearward force is exerted on the rod 408 by an expansion spring 411 mounted thereon and acting between the bracket 409 and a shoulder 412 at the rear end of the rod 408.

The ejector slides 385 are normally held in their upper illustrated position against the force of the spring 411 by the engagement of the roller 406 at the end of the arm 405 with the concentric circular portion of the cam disc 407. However, a depressed portion or notch 415 (see Fig. 2) is provided in the edge of the cam disc 407 which notch is located to allow a rearward motion of the lower end of the arm 405 by receiving the roller 406 at the time the plungers 320 reach their extreme forward position. This rearward motion of the lower end of the arm 405 will at this point be effected by the force of the spring 411 to move the ejector slides 385 downwardly past the ends of the plungers 320 and forcefully eject the key cards downwardly through the opening 380 in the frame 250.

It will be noted however, that the ejector slides 385 are not positively driven downwardly by the operating power of the machine but are allowed to move downwardly under the force of the spring 411. Thus if there should be any obstruction to the downward movement of the ejector slides, merely the force of the spring 411 would be resisted and no damage would be done to the ejector mechanism or other parts of the machine.

The profile of the main operating cams 298 is shown in Fig. 2 wherein it may be seen that there is a dwell extending through about 10 degrees each side of the dotted radial line E, and it may also be seen that the radial line E passes substantially through the center of the notch 415 in the cam disc 407. It will then be clear that the movable dies 310 and the plungers 320 will be stationary throughout a period of about 20 degrees of the rotation of the cams 298 during which period the complete cycle of downward and upward movement of the ejector fingers 385 is effected. In this manner, the ejector fingers 385 will not engage or be engaged by the dies 310 or plungers 320 during their operating movement.

Referring still to Fig. 2, it will be noted that there is another dwell extending through about 12½ degrees each side of the dotted radial line L. The radius of this dwell portion around line L is such that the dies 310 and plungers 320 are positioned as shown in Fig. 30 for admitting the key cards into the respective sleeves 321, and accordingly the dies 310 and plungers 320 will be stationary throughout a period of about 25 degrees of the rotation of the cams 298, during which period the movement of the key cards into the sleeves 321 takes place.

It may also be seen in Fig. 2 that the large diameter portion of the cams 298 extends throughout about 215 degrees, and although it cannot be observed in the drawings, this 215 degree portion has a very slight rise or gradually increasing radius through about 90 degrees of the end thereof which is initially engaged by the rollers 299, and the remaining 125 degree portion is of uniform radius. In this manner it will be clear that the final or maximum pressure is applied to the key cards very gradually through the dies 310 and that this maximum pressure is maintained throughout a substantial part of the cycle of operation. The pressure is thus maintained on the key cards for an extended period to allow the Celluloid discs 126 and 127 to be thoroughly heated from the dies 310 and thereby permanently retain the shape to which they are pressed.

Feed blocking means

In the present machine it may at times be found necessary or desirable to press key cards in fewer than the total number of simultaneously operating pressing means. This may be occasioned, for example, by the failure or burning out of one or more of the electrical heating units 316 in the movable dies 310, which will render such dies inoperative to properly press the key cards. Inasmuch as the key cards are conveyed to each of the five pressing means through individual channels, there are means provided herein for readily blocking or preventing key cards from passing through any one or more of these individual channels which may lead to an inoperative pressing means and yet which allows all other channels to convey the key cards therein in the usual manner.

Referring to Figs. 3 and 25, it may be seen that there is a manually operable blocking device, designated as a whole by the reference numeral 420 mounted above each of the five feeding channels formed between the guide strips 285. These blocking devices are all attached to a transverse strip 421 mounted above and at the upper ends of the card retaining strips 287. Although these blocking devices 420 may be of various constructions, the particular form shown in Fig. 3 comprises a pin 422 mounted for longitudinal movement in a cylindrical housing 423. The pin 422 is pressed downwardly to its blocking position as shown in Fig. 3 by an expansion spring 424 acting between the housing 423 and a shoulder on the lower end of the pin 422. A finger piece 425 having a hollow portion receiving the upper end of the housing 423 is attached to the upper end of the pin 422, whereby the pin 422 may be readily raised against the force of the spring 424 from its blocking position shown in Fig. 3 to a position which is out of the path of the key cards in its companion channel.

In order to retain the pin 422 in its upper position, an inwardly extending pin 426 is provided in the finger piece 425 which enters a longitudinal slot 427 in the housing 423. Thus, when the finger piece 425 is raised, the pin 426 is removed from the slot 427, and by turning the finger piece 425, the pin 426 will be positioned to engage the upper end of the housing 423 and thereby hold the blocking pin 422 in its upper position against the force of the spring 424.

In the event that one or more of the five feeding channels are blocked by the blocking devices 420, it will be clear that the rate of pressing of the key cards will be decreased, and may be decreased to the extent that the key cards are delivered thereto from the selecting mechanism faster than they can be handled by the pressing mechanism. Accordingly, it is intended that the speed of operation of the selecting or delivering mechanism should be regulated by the change gear arrangement connecting the shaft 130 with the shaft 85 so that the speed at which the cards are arranged by the delivering mechanism shall accord as nearly as possible with the speed at which they are being pressed. In other words, the rate of operation of the delivering mechanism may be selected in accordance with the number of key cards being simultaneously pressed. Thus a decreased rate of pressing may be prevented from causing an accumulation of arranged but unpressed key cards which might clog or prevent proper operation of the delivering mechanism.

The present machine may be readily adapted to operate on different sizes of key cards. For example, in the delivering mechanism, the guide plate 100 may be adjusted relative to the opposite guide plate 110 for key cards of a different diameter and otherwise the delivering mechanism operates without adjustment for any of the different diameter key cards ordinarily used in typewriting and like machines. In the pressing mechanism, the dies 310 may be readily replaced by similar dies having a larger or smaller protruding end portion 310ª. The guide plate 340, the sleeves 321 and plungers 320 may likewise be readily replaced by similar parts adapted to either larger or smaller key cards.

From the foregoing description, it will be apparent that by my invention I have provided an improved, highly efficient and reliable machine for automatically pressing key cards or similar articles. In this machine, it may be seen that the key cards are not handled from the time they are placed in an entirely unrelated or jumbled condition in the hopper until they are discharged from the machine automatically after a concavity has been pressed in the same side of each card.

While I have referred herein more particularly to the forming of a concavity in one particular type of a key card for typewriting and like machines, it should be understood that my invention may be embodied in a machine for forming any other configuration in such a key card or like article or for merely pressing the cards or other like articles without altering the contour thereof. It will also be understood that my invention is not limited to a machine for forming the particular type or size of key cards herein described but may be arranged to act upon an article of substantially any shape or size which it may be desirable to press.

Furthermore, it will be understood that various other changes may be made in the construction, and certain features thereof may be omitted, without departing from my invention as it is defined in the accompanying claims.

What I claim as new and desire to secure by Letters Patent is:

1. In a machine of the class described, the combination of a hopper for containing key cards or like articles in varying relation, each card having oppositely disposed flat sides and a relatively smooth contact face on one side only thereof, card pressing means, and automatically operating means for delivering the cards from the hopper to said card pressing means including selecting means inoperative to effectively engage cards having the smooth face thereof exposed and operative to effectively engage and turn cards having the reverse side exposed.

2. In a machine of the character described, the combination of a hopper for containing key cards or like articles in varying relation, each card having oppositely disposed flat sides and a relatively smooth contact surface on one side only thereof, automatically operating card pressing means for pressing a concavity in one and the same face of all of the cards, and automatically operating means for delivering the cards from said hopper to the card pressing means including a selecting device inoperative to effectively engage cards having the smooth contact surface thereof exposed and operative to effectively engage and move cards having the reverse side exposed and means for turning cards moved by said selecting device so that each card bears the same relation to the pressing means and the same face of each card has a concavity pressed therein by said pressing means.

3. In a machine of the character described, the combination of a hopper for containing key cards or like articles in varying relation, each card having oppositely disposed flat sides and a relatively smooth contact surface on one side only thereof, automatically operating card pressing means for pressing a concavity in one and the same face of all of the cards, and automatically operating means for delivering the cards from said hopper to the card pressing means in such a manner that each card bears the same relation to the pressing means and the same face of each card has a concavity pressed therein by said pressing means, said delivery means comprising selecting means inoperative to effectively engage cards having the smooth contact surface thereof exposed and operative to effectively engage and turn cards having the reverse side exposed, and means for delivering the cards to the pressing means in timed relation to the operation of said pressing means.

4. In a machine of the character described, the combination of a hopper for containing key cards or like articles, one face of each card being relatively rough with respect to the opposite face, automatically operating card pressing means for pressing a concavity in one and the same face of all of the cards, and automatically operating means for delivering the cards from said hopper to the card pressing means in such a manner that each card bears the same relation to the pressing means and the same face of each card has a concavity pressed therein by said pressing means, said delivery means comprising two delivery chutes, an automatically actuated selecting means operative in contact with the exposed face of each card and effective to move only those cards having the relatively rough face exposed, and means for turning the cards moved by said selecting means and for delivering them to one of said chutes, the cards unaffected by said selecting device being delivered to the other of said chutes.

5. In a machine of the character described, the combination of a hopper for containing key cards or like articles, one face of each card being relatively rough with respect to the opposite face, automatically operating card pressing means for pressing a concavity in one and the same face of all of the cards, and automatically operating means for delivering the cards from said hopper to the card pressing means in such a manner that each card bears the same relation to the pressing means and the same face of each card has a concavity pressed therein by said pressing means, said delivery means comprising two delivery chutes, an automatically actuated selecting means operative in contact with the exposed face of each card and effective to move only those cards having the relatively rough face exposed, means for turning the cards moved by said selecting means and for delivering them to one of said chutes, the cards unaffected by said selecting device being delivered to the other of said chutes, and means for receiving the cards from said delivery chutes and conveying them successively to the pressing means in timed relation to the operation thereof and in the same relation thereto.

6. In a machine of the character described, the combination of a hopper for containing key cards or like articles in varying relation, each card having opposite faces of similar shape and a relatively smooth contact surface on one face only thereof, automatically operating card pressing means for pressing a concavity in one and the same face of all of the cards, and automatically operating means for delivering the cards from said hopper to the card pressing means including selecting means inoperative to effectively engage cards having the smooth face thereof exposed and operative to effectively engage and turn cards having the reverse face exposed, and an automatically actuated vibratory device which receives the cards in a flat condition and aids in the delivery thereof in such condition to the card pressing means.

7. In a machine of the character described, the combination of a hopper for containing key cards or like articles each having a relatively smooth face on one side and a relatively rough face on the other side thereof, pressing means for said cards, and automatically operating delivery means for conveying the cards from said hopper to the pressing means including a selecting device inoperative to effectively engage the smooth side of each card and operative to effectively engage the rough side of each card that is presented to the selecting device and to shift such effectively engaged card out of the path of travel of the other cards.

8. In a machine of the character described, the combination of a hopper for containing key cards or like articles each having a relatively smooth face on one side and a relatively rough face on the other side thereof, pressing means for said cards, automatically operating delivery means for conveying the cards from said hopper to the pressing means including a selecting device inoperative to effectively engage the smooth side of each card and operative to effectively engage the rough side of each card that is presented to the selecting device and to shift such effectively engaged card out of the path of travel of the other cards, and means for receiving cards from said selecting device and for turning them so that all of the cards may be presented to the pressing means with the smooth faces of the cards bearing the same relation to the pressing means.

9. In a machine of the character described, the combination of a hopper for containing key cards or like articles each having a relatively smooth face on one side and a relatively rough face on the other side thereof, pressing means for said cards, and automatically operating delivery means for conveying the cards from said hopper to the pressing means including a selecting device inoperative to effectively engage the smooth side of each card and operative to effectively engage the rough side of each card that is presented to the selecting device and to shift such effectively engaged card out of the path of travel of the other cards, two chutes one of which receives the cards that are not moved by the selecting device and the other of which receives the cards that are shifted by said selecting device, and means in said last mentioned chute for turning the cards that pass therethrough, whereby the cards may be presented to the pressing means with the smooth faces of all of the cards bearing the same relation to the pressing means.

10. In a machine of the character described, the combination of a hopper for containing key cards or like articles each having a relatively smooth face on one side and a relatively rough face on the other side thereof, pressing means for said cards, and automatically operating delivery means for conveying the cards from said hopper to the pressing means including an automatically actuated selecting finger inoperative to effectively engage the smooth side of each card and operative to effectively engage the rough side of each card that is presented to the selecting device and to shift such effectively engaged card, means for causing the cards to pass from the hopper one at a time to said selecting finger, and means for causing the cards which are shifted by said selecting finger to travel in a different path from those cards that are not affected by the selecting finger.

11. In a machine of the character described, the combination of a hopper for containing key cards or like articles each having a relatively smooth face on one side and a relatively rough face on the other side thereof, pressing means for said cards, and automatically operating delivery means for conveying the cards from said hopper to the pressing means including an automatically actuated selecting finger inoperative to effectively engage the smooth side of each card and operative to effectively engage the rough side of each card that is presented to the selecting device and to shift such effectively engaged card, means for causing the cards to pass from the hopper one at a time to said selecting finger, means for causing the cards which are shifted by said selecting finger to travel in a different path from those cards that are not affected by the selecting finger, and automatically operating means which coact with the cards that are shifted by said selecting finger to turn them so that all of the cards may be presented to the pressing means with the smooth faces thereof bearing the same relation to said pressing means.

12. In a machine of the character described, the combination of a hopper for containing key cards or like articles each having a relatively smooth face on one side and a relatively rough face on the other side thereof, pressing means for said cards, and automatically operating delivery means for conveying the cards from said hopper to the pressing means including a selecting device inoperative to effectively engage the smooth side of each card and operative to effectively engage the rough side of each card that is presented to the selecting device and to shift such effectively engaged card, and an automatically operated holding device effective to hold a card on which said selecting device is ineffective and during a part of the operation of the action of the selecting device thereon, said holding means being ineffective on a card which is shifted by said selecting device.

13. In a machine of the character described, the combination of a hopper for containing key cards or like articles in an unrelated condition each card having opposite sides of similar shape and a contact face on one side thereof, means for automatically discharging the cards successively from said hopper in a flat but otherwise unrelated condition, and automatically operating controlling means for turning only such of said cards as are presented with the contact faces thereof reversed, said last mentioned means including a selecting device movable in contact with the exposed side of each card to ineffectively engage cards having the contact face exposed and to effectively engage and move cards having the reverse side exposed 14. In a machine of the character described, the combination of a hopper for containing key cards or like articles in an unrelated condition each card having opposite sides of similar shape and a contact face on one side thereof, means for automatically discharging the cards successively from said hopper in a flat but otherwise unrelated condition, selecting means moving in contact with the exposed side of each card to ineffectively engage cards which are presented with the contact face thereof exposed and to effectively engage and turn only such of said cards as are presented with the contact faces thereof reversed, and card pressing means that receive the cards from said controlling means, whereby all of the cards are presented to said pressing means with the contact faces of the cards in the same relation.

15. In a machine of the character described, the combination of a hopper for containing key cards or like articles in an unrelated condition each card having opposite sides of similar shape and a contact face on one side thereof, means for automatically discharging the cards successively from said hopper in a flat but otherwise unrelated condition, automatically operating controlling means for turning only such of said cards as are presented with the contact faces thereof reversed, a vibratory support which receives the cards in a flat condition and with their contact faces in the same relation from said controlling means, and delivery chutes for receiving the cards from said vibratory support.

16. In a machine of the character described, the combination of a hopper for containing key cards or like articles in an unrelated condition each card having opposite sides of similar shape and a contact face on one side thereof, means for automatically discharging the cards successively from said hopper in a flat but otherwise unrelated condition, automatically operating controlling means for turning only such of said cards as are presented with the contact faces thereof reversed, a vibratory support which receives the cards in a flat condition and with their contact faces in the same relation from said controlling means, delivery chutes for receiving the cards from said vibratory support, and gang card pressing means that receive the cards from said delivery chutes with the contact faces of all of the cards in the same relation.

17. In a machine of the character described, the combination of a hopper for containing key cards or like articles in an unrelated condition each card having opposite sides of similar shape and a contact face on one side thereof, means for automatically discharging the cards successively from said hopper in a flat but otherwise unrelated condition, automatically operating controlling means for turning only such of said cards as are presented with the contact faces thereof reversed, a vibratory support which receives the cards in a flat condition and with their contact faces in the same relation from said controlling means, delivery chutes for receiving the cards from said vibratory support, gang card pressing means that receive the cards from said delivery chutes with the contact faces of all of the cards in the same relation, and automatically operating means for discharging said cards from the machine after they have been pressed by said pressing means.

18. In a machine of the character described, the combination of a hopper for containing key cards or like articles in an unrelated condition each card having opposite sides of similar shape and a contact face on one side thereof, means for automatically discharging the cards successively from said hopper in a flat but otherwise unrelated condition, automatically operating controlling means for turning only such of said cards as are presented with the contact faces thereof reversed, a vibratory support which receives the cards in a flat condition and with their contact faces in the same relation from said controlling means, delivery chutes for receiving the cards from said vibratory support, gang card pressing means that receive the cards from said delivery chutes with the contact faces of all of the cards in the same relation, and automatically operating means associated with each delivery chute for affording a delivery of but one card at a time to each element of said gang pressing means.

19. In a machine of the character described, the combination of a hopper for containing key cards or like articles in an unrelated condition each card having opposite sides of similar shape and a contact face on one side thereof, means for automatically discharging the cards successively from said hopper in a flat but otherwise unrelated condition, automatically operating controlling means for turning only such of said cards as are presented with the contact faces thereof reversed, a vibratory support which receives the cards in a flat condition and with their contact faces in the same relation from said controlling means, delivery chutes for receiving the cards from said vibratory support, gang card pressing means that receive the cards from said delivery chutes with the contact faces of all of the cards in the same relation, and means settable at will to prevent a feed of the cards through any one or more of said delivery chutes.

20. In a machine of the character described, the combination of a hopper for containing key cards or like articles each having a relatively smooth face on one side and a relatively rough face on the other side thereof, passing means for said cards, and automatically operating means for delivering the cards from said hopper to said pressing means including a selecting finger operating transversely of the usual path of travel of the cards in contact with the exposed side thereof, means for varying the contacting force of said selecting finger with the side of the cards, whereby said contacting force is ineffective to move cards having the smooth side thereof exposed but is effective to move cards having the rough side exposed.

21. In a machine of the character described, the combination of a hopper for containing key cards or like articles each having a relatively smooth face on one side and a relatively rough face on the other side thereof, passing means for said cards, and automatically operating delivery means for conveying the cards from said hopper to the pressing means including a selecting device having a forward selecting movement ineffectively engaging the smooth side of each card and effectively engaging the rough side of each card to shift such effectively engaged card out of the path of travel of the other cards, and means automatically shifting said selecting device out of engagement with the cards upon the return movement of said selecting device.

22. In a machine of the character described, the combination of a support for key cards or like articles each having a relatively smooth face on one side and a relatively rough face on the other side thereof, and automatically operating delivery means including a selecting finger operating transversely of the usual path of travel of the cards on said support in contact with the exposed side of each card, means for varying the contacting force of said selecting finger with the side of the cards, whereby said contacting force is ineffective to move cards having the smooth side thereof exposed but is effective to more cards having the rough side exposed.

23. In a machine of the character described, the combination of a support for key cards or like articles each having a relatively smooth face on one side and a relatively rough face on the other side thereof, and automatically operating delivery means including a selecting device having a forward selecting movement ineffectively engaging the smooth side of each card and effectively engaging the rough side of each card to shift such effectively engaged card out of the path of travel of the other cards on said support, and means automatically shifting said selecting device out of engagement with the cards during the return movement of said selecting device.

24. In a machine of the character described, the combination of a support for key cards or like articles each having a relatively smooth face on one side and a relatively rough face on the other side thereof, and automatically operating delivery means including a selecting device ineffectively engaging the smooth side of each card and effectively engaging the rough side of each card to shift such effectively engaged card out of the path of travel of the other cards on said support.

25. In a device for automatically arranging articles each having a relatively smooth face on one side and a similar shaped relatively rough face on the other side thereof, the combination of means for conveying said articles in a flat but otherwise unrelated condition, means mechanically engaging the exposed face of each of said articles in said conveying means to shift only those articles having the relatively rough face exposed, and means for turning the shifted articles relative to the other articles so that all of said articles face in the same direction.

26. In a device for automatically arranging articles each having a relatively smooth face on one side and similar shaped relatively rough face on the opposite side thereof, the combination of a selecting finger operating on either the smooth or the rough face of each of said articles and effective to shift the article only when operating on the rough side thereof, and means for turning the articles which are shifted by said selecting finger so that all of said articles face in the same direction.

27. In a device for automatically arranging articles each having a relatively smooth face on one side and a similar shaped relatively rough face on the opposite side thereof, the combination of delivery means for conveying said articles in edgewise relation but otherwise unrelated, a selecting finger operating transversely of the path of travel of said articles in said delivery means and contacting with the exposed face of each of the articles, regulating means for varying the contacting force of said selecting finger with the face of each of said articles to afford movement of the articles by the selecting finger only when contacting the rough side thereof, and means for turning in one direction all articles moved by said selecting finger and for turning all other articles in another direction so that all of said articles face in the same direction.

28. In a device for automatically arranging articles each having a relatively smooth face on one side and a similar shaped relatively rough face on the opposite side, the combination of delivery means for conveying said articles in edgewise but otherwise unrelated condition, a selecting finger operable transversely of the path of travel of said articles in said delivery means and in contact with the exposed face of each of the articles and arranged to move only such articles therewith which have the rough face thereof exposed, means for reversing the articles moved by the selecting finger, and holding means effective to hold the articles during the latter part of the travel of said selecting finger in contact therewith, said holding means being ineffective on the articles moved by the selecting finger.

FREDERICK M. ZENNER.